(12) United States Patent
Zhang et al.

(10) Patent No.: US 12,701,616 B2
(45) Date of Patent: Aug. 4, 2026

(54) COMMUNICATION METHOD AND APPARATUS FOR AVOIDING CONFLICT

(71) Applicant: HUAWEI TECHNOLOGIES CO., LTD., Shenzhen (CN)

(72) Inventors: Hongping Zhang, Shenzhen (CN); Xingxing Hu, Shanghai (CN); Hongzhuo Zhang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 694 days.

(21) Appl. No.: 17/887,135

(22) Filed: Aug. 12, 2022

(65) Prior Publication Data

US 2022/0394779 A1     Dec. 8, 2022

Related U.S. Application Data

(63) Continuation of application No. PCT/CN2021/074666, filed on Feb. 1, 2021.

(30) Foreign Application Priority Data

Feb. 14, 2020     (CN) .......................... 202010093555.0

(51) Int. Cl.
*H04W 74/0833* (2024.01)
(52) U.S. Cl.
CPC ................................ *H04W 74/0833* (2013.01)
(58) Field of Classification Search
CPC ........... H04W 74/0833; H04W 56/005; H04W 24/02; H04W 84/18; H04L 5/001; H04L 5/0053
See application file for complete search history.

(56) References Cited

U.S. PATENT DOCUMENTS

| | | | |
|---|---|---|---|
| 2019/0132778 A1 | 5/2019 | Park et al. | |
| 2020/0120553 A1* | 4/2020 | Wang | H04W 76/34 |
| 2021/0051579 A1* | 2/2021 | Luo | H04W 48/20 |

FOREIGN PATENT DOCUMENTS

| | | |
|---|---|---|
| CN | 108809595 A | 11/2018 |
| CN | 109152086 A | 1/2019 |

(Continued)

OTHER PUBLICATIONS

"3rd Generation Partnership Project; Technical Specification Group Radio Access Network; NG-RAN; F1 application protocol (F1AP) (Release 15)," 3GPP TS 38.473 V15.7.0, pp. 1-221, 3rd Generation Partnership Project, Valbonne, France (Sep. 2019).

(Continued)

*Primary Examiner* — Justin T Van Roie
(74) *Attorney, Agent, or Firm* — Leydig, Voit & Mayer, Ltd.

(57)     ABSTRACT

A communication method and an apparatus are provided. When a cell served by a distributed unit (DU) of an access network device and a neighboring cell use different timing, the DU may obtain timing configurations of a first cell and a second cell, or a random access channel (RACH) configuration that is of a second cell and that is based on timing of a first cell. When the method is applied to a RACH optimization scenario, the DU may determine, at same timing, RACH configurations of the two cells based on the foregoing obtained information, to accurately identify whether a RACH configuration conflict occurs between the cell and the neighboring cell, optimize the RACH configuration of the cell when the conflict occurs, and ensure a success rate and an access latency of random access performed by a terminal device.

15 Claims, 13 Drawing Sheets

Frame number n

RACH configuration that is of a first cell and that is based on timing of the first cell RACH configuration that is of a second cell and that is based on timing of the second cell Time

(56)                 References Cited

FOREIGN PATENT DOCUMENTS

| CN | 109526039 | A  | 3/2019  |
|----|-----------|----|---------|
| CN | 110351807 | A  | 10/2019 |
| CN | 110475335 | A  | 11/2019 |
| WO | 2019051152 | A1 | 3/2019  |
| WO | 2019170210 | A1 | 9/2019  |
| WO | 2019214739 | A1 | 11/2019 |
| WO | 2020030022 | A1 | 2/2020  |

OTHER PUBLICATIONS

"Reply LS on PRACH configuration conflict detection," 3GPP
TSG-RAN WG1 #99, Reno, USA, R1-1913578, Total 2 pages, 3rd
Generation Partnership Project, Valbonne, France (Nov. 18-22,
2019).

* cited by examiner

Core network
device 110

Radio access
network device 120

Terminal
device 130

Terminal
device 140

Frame number n
of a first cell

Frame number n
of a second cell

A first CU obtains a timing offset between a first cell and a second cell and a second RACH configuration of the second cell    S1501

The first CU converts the second RACH configuration of the second cell into a first RACH configuration of the second cell based on the timing offset between the first cell and the second cell    S1502

COMMUNICATION METHOD AND APPARATUS FOR AVOIDING CONFLICT

CROSS-REFERENCE TO RELATED APPLICATIONS

This application is a continuation of International Application No. PCT/CN2021/074666, filed on Feb. 1, 2021, which claims priority to Chinese Patent Application No. 202010093555.0, filed on Feb. 14, 2020. The disclosures of the aforementioned applications are hereby incorporated by reference in their entireties.

TECHNICAL FIELD

Embodiments of this application relate to communication technologies, and in particular, to a communication method and an apparatus.

BACKGROUND

A 5G communication system supports a self-organized network (SON) mechanism, to automatically complete parameter configuration and optimization of a cellular mobile communication network device, reduce manual participation in a network operation and management process, improve network reliability, and reduce operating costs. A function of the SON is self-optimization. The self-optimization enables a network device to automatically adjust a radio parameter based on a network running status, to optimize network performance.

The self-optimization includes random access channel (RACH) optimization. The RACH optimization aims to avoid a conflict between a RACH configuration of a cell and a RACH configuration of a neighboring cell by adjusting the RACH configuration of the cell, to ensure a success rate and an access latency of random access performed by a terminal device to the cell. For an access network device in a centralized unit (CU)/distributed unit (DU) architecture in the 5G communication system, a RACH configuration of a cell is determined by a DU to which the cell belongs. The DU determines, based on a RACH report reported by a terminal device that accesses the cell served by the DU and a RACH configuration of a neighboring cell of the cell, whether there is a conflict between a RACH configuration of the cell and the RACH configuration of the neighboring cell of the cell. When there is the conflict, the DU may optimize the RACH configuration of the cell, that is, the DU changes some or all parameters in the RACH configuration of the conflicting cell, to avoid the conflict.

SUMMARY

Embodiments of this application provide a communication method and an apparatus, to resolve a technical problem that when a cell served by a DU and a neighboring cell use different timing, the DU cannot identify whether there is a conflict between a RACH configuration of the cell and a RACH configuration of the neighboring cell.

According to a first aspect, an embodiment of this application provides a communication method. The method may be applied to a CU of a first access network device, or may be applied to a chip in the CU. The following describes the method by using an example in which the method is applied to the CU.

In this method, the CU of the first access network device may obtain a timing offset between a first cell and a second cell.

The first cell herein is a cell served by a DU of the first access network device, and the second cell is a neighboring cell of the first cell. The second cell may be a cell served by the DU, or may be a cell served by another DU of the first access network device, or may be a cell served by a second access network device.

The timing offset between the first cell and the second cell means an offset between timing of the two cells. For example, the timing offset may include: a frame number offset and a frame boundary offset between the first cell and the second cell, a frame number offset, a subframe number offset, and a subframe boundary offset between the first cell and the second cell, a time offset, relative to a frame boundary of a same frame, between the first cell and the second cell, or the like.

Then, the CU of the first access network device may send the timing offset between the first cell and the second cell to the DU of the first access network device.

In the foregoing manner, the DU may learn of the timing offset between the first cell and the second cell. When the method is applied to a RACH optimization scenario, and a cell served by a DU of an access network device and a neighboring cell use different timing, the DU may accurately identify, based on a timing offset that is between the cell and the neighboring cell and that is sent by a CU, whether a RACH configuration conflict occurs between the cell and the neighboring cell, to optimize a RACH configuration of the cell when the conflict occurs, and ensure a success rate and an access latency of random access performed by a terminal device.

It should be understood that the timing offset that is between the first cell and the second cell and that is learned of by the DU may also be applied to another scenario in which the timing offset needs to be used. This is not limited herein.

Optionally, the CU may send the timing offset between the first cell and the second cell to the DU in the following several manners.

Manner 1: The DU actively requests to obtain the timing offset. For example, the CU receives a request message from the DU, where the request message is for requesting to obtain the timing offset between the first cell and the second cell, or requesting to obtain a random access channel RACH configuration of the second cell. Then, the CU sends the timing offset between the first cell and the second cell to the DU based on the request message. Optionally, the request message may carry an identifier of the first cell.

Manner 2: The CU sends the timing offset to the DU in an F1 setup process. For example, the CU receives an F1 setup request message from the DU, and then the CU sends an F1 setup response message to the DU, where the F1 setup response message includes the timing offset between the first cell and the second cell.

Manner 3: The CU actively sends the timing offset. For example, the CU sends a CU configuration update message to the DU, where the CU configuration update message includes the timing offset between the first cell and the second cell.

In any one of the foregoing manners, the CU may send the timing offset between the first cell and the second cell to the DU by using different messages, so that a scenario in which the DU obtains the timing offset is extended.

Optionally, the CU may obtain the timing offset between the first cell and the second cell in the following several manners. For example, the CU receives the timing offset between the first cell and the second cell from a terminal device. Alternatively, when the second cell is the cell served by the second access network device, the CU may receive the timing offset between the first cell and the second cell from the second access network device. In any one of the foregoing manners, an implementation of obtaining, by the CU, the timing offset between the first cell and the second cell is extended.

According to a second aspect, an embodiment of this application provides a communication method. The method may be applied to a DU of a first access network device, or may be applied to a chip in the DU. The following describes the method by using an example in which the method is applied to the DU.

In this method, the DU of the first access network device may receive a timing offset between a first cell and a second cell from a CU of the first access network device. Then, the DU may store the timing offset between the first cell and the second cell. For descriptions of the first cell, the second cell, and the timing offset between the first cell and the second cell, refer to the first aspect.

Optionally, the method may further include: The DU receives a random access channel RACH configuration of the second cell from the CU. Then, the DU determines, based on the timing offset between the first cell and the second cell, the RACH configuration of the second cell, and a RACH configuration of the first cell, whether there is a conflict between the RACH configuration of the first cell and the RACH configuration of the second cell.

In this implementation, if there is the conflict between the RACH configuration of the first cell and the RACH configuration of the second cell, the DU may reconfigure a RACH configuration for the first cell. For example, the DU may change some or all parameters in the RACH configuration of the first cell, to avoid the conflict with the RACH configuration of the second cell. If there is no conflict between the RACH configuration of the first cell and the RACH configuration of the second cell, the DU may not perform any processing.

For beneficial effects of the communication method provided in the second aspect and the possible implementations of the second aspect, refer to the beneficial effects brought by the first aspect and the possible implementations of the first aspect. Details are not described herein again.

According to a third aspect, an embodiment of this application provides a communication method. The method may be applied to a CU of a first access network device, or may be applied to a chip in the CU. The following describes the method by using an example in which the method is applied to the CU.

In this method, the CU of the first access network device may obtain a first RACH configuration of a second cell, where the first RACH configuration of the second cell is based on timing of a first cell. Then, the CU of the first access network device may send the first RACH configuration of the second cell to a DU of the first access network device. For descriptions of the first cell and the second cell, refer to the first aspect.

In the foregoing manner, the DU may learn of the first RACH configuration of the second cell. When the method is applied to a RACH optimization scenario, and a cell served by a DU of an access network device and a neighboring cell use different timing, the DU may accurately identify, based on a RACH configuration that is of the neighboring cell, that is based on timing of the cell, and that is sent by a CU, and a RACH configuration that is of the cell and that is based on the timing of the cell, that is, based on the RACH configurations that are of the two cells and that are based on the same timing, whether a RACH configuration conflict occurs between the cell and the neighboring cell, to optimize the RACH configuration of the cell when the conflict occurs, and ensure a success rate and an access latency of random access performed by a terminal device.

Optionally, the CU may obtain the first RACH configuration of the second cell in the following two manners.

Manner 1: The CU obtains a timing offset between the first cell and the second cell and a second RACH configuration of the second cell. The second RACH configuration of the second cell is based on timing of the second cell. Then, the CU converts the second RACH configuration of the second cell into the first RACH configuration of the second cell based on the timing offset between the first cell and the second cell. For explanations of the timing offset between the first cell and the second cell and a manner in which the CU obtains the timing offset between the first cell and the second cell, refer to the descriptions in the first aspect.

It should be understood that, in some embodiments, the CU may have no timing offsets between the first cell and some or all second cells adjacent to the first cell. In this scenario, the first CU may not perform the RACH configuration conversion operation.

Manner 2: When the second cell is a cell served by a second access network device, the CU may receive the first RACH configuration of the second cell from the second access network device.

In some embodiments, the second access network device may have no timing offset between the first cell and the second cell. In this scenario, the second access network device may not perform the RACH configuration conversion operation, but send the second RACH configuration of the second cell to the CU of the first access network device. Therefore, to enable the CU of the first access network device to accurately learn that a received RACH configuration of the second cell is a RACH configuration that is based on timing of a specific cell, that the CU of the first access network device receives the first RACH configuration of the second cell from the second access network device may include: The CU of the first access network device receives a RACH configuration of the second cell and first indication information from the second access network device. The first indication information indicates that the RACH configuration of the second cell is a RACH configuration that is based on the timing of the first cell.

Optionally, the CU may send the first RACH configuration of the second cell to the DU in the following three manners.

Manner 1: The DU actively requests to obtain a RACH configuration of the second cell. For example, the CU receives a request message from the DU, to request to obtain the RACH configuration of the second cell. Then, the CU sends the first RACH configuration of the second cell to the DU based on the request message. Optionally, the request message may carry an identifier of the first cell.

Manner 2: The CU sends the first RACH configuration of the second cell to the DU in an F1 setup process. For example, the CU receives an F1 setup request message from the DU. Then, the CU sends an F1 setup response message to the DU, where the F1 setup response message includes the first RACH configuration of the second cell.

Manner 3: The CU actively sends the first RACH configuration of the second cell. For example, the CU sends a CU configuration update message to the DU, where the CU configuration update message includes the first RACH configuration of the second cell.

In any one of the foregoing manners, the CU may send the first RACH configuration of the second cell to the DU by using different messages, so that a scenario in which the DU obtains the first RACH configuration of the second cell is extended.

As described above, in some embodiments, some RACH configurations that are of the second cell and that are obtained by the CU are not RACH configurations that are based on the timing of the first cell. In this case, the first CU may not send, to the first DU, the RACH configurations that are of the second cell and that are not based on the timing of the first cell, that is, send only a RACH configuration that is of the second cell and that is based on the timing of the first cell. Alternatively, when the first CU sends a RACH configuration of the second cell to a first DU, second indication information may be further carried, where the second indication information indicates whether the RACH configuration of the second cell is a RACH configuration that is based on the timing of the first cell. In this way, after receiving the RACH configuration of the second cell sent by the first CU, the first DU may learn, based on the second indication information, whether the RACH configuration of the second cell is the RACH configuration that is based on the timing of the first cell.

According to a fourth aspect, an embodiment of this application provides a communication method. The method may be applied to a DU of a first access network device, or may be applied to a chip in the DU. The following describes the method by using an example in which the method is applied to the DU.

In this method, the DU of the first access network device receives a first RACH configuration of a second cell from a CU of the first access network device. The first RACH configuration of the second cell is based on timing of a first cell. Then, the DU of the first access network device may store the first RACH configuration of the second cell. For descriptions of the first cell and the second cell, refer to the first aspect.

Optionally, the method may further include: The DU determines, based on the first RACH configuration of the second cell and a RACH configuration of the first cell, whether there is a conflict between the RACH configuration of the first cell and the first RACH configuration of the second cell.

In this implementation, if there is the conflict between RACH configuration of the first cell and the first RACH configuration of the second cell, the DU reconfigures a RACH configuration for the first cell. For example, the DU may change some or all parameters in the RACH configuration of the first cell, to avoid the conflict with the RACH configuration of the second cell. If there is no conflict between the RACH configuration of the first cell and the first RACH configuration of the second cell, the DU may not perform any processing.

For beneficial effects of the communication method provided in the fourth aspect and the possible implementations of the fourth aspect, refer to the beneficial effects brought by the third aspect and the possible implementations of the third aspect. Details are not described herein again.

According to a fifth aspect, an embodiment of this application provides a communication apparatus. The communication apparatus may include a processing module and a sending module. Optionally, in some embodiments, the communication apparatus may further include a first receiving module and/or a second receiving module.

The processing module is configured to obtain a timing offset between a first cell and a second cell. The first cell is a cell served by a DU, the second cell is a neighboring cell of the first cell, and both a CU and the DU belong to a first access network device. The timing offset between the first cell and the second cell means an offset between timing of the two cells. For example, the timing offset may include: a frame number offset and a frame boundary offset between the first cell and the second cell, a frame number offset, a subframe number offset, and a subframe boundary offset between the first cell and the second cell, a time offset, relative to a frame boundary of a same frame, between the first cell and the second cell, or the like. For example, the processing module is specifically configured to obtain the timing offset between the first cell and the second cell by using the timing offset that is between the first cell and the second cell and that is received by the second receiving module from a terminal device. In this case, the processing module and the second receiving module may alternatively be integrated into the processing module or the second receiving module. Alternatively, when the second cell is a cell served by a second access network device, the processing module is specifically configured to obtain the timing offset between the first cell and the second cell by using the timing offset that is between the first cell and the second cell and that is received by the second receiving module from the second access network device. In this case, the processing module and the second receiving module may alternatively be integrated into the processing module or the second receiving module.

The sending module is configured to send the timing offset between the first cell and the second cell to the DU.

For example, the first receiving module is configured to receive a request message from the DU. The request message is for requesting to obtain the timing offset between the first cell and the second cell, or requesting to obtain a random access channel RACH configuration of the second cell. Correspondingly, the sending module is specifically configured to send the timing offset between the first cell and the second cell to the DU based on the request message. Optionally, the request message carries an identifier of the first cell.

Alternatively, the first receiving module is configured to receive an F1 setup request message from the DU. Correspondingly, the sending module is specifically configured to send an F1 setup response message to the DU, where the F1 setup response message includes the timing offset between the first cell and the second cell.

Alternatively, the sending module is specifically configured to send a CU configuration update message to the DU, where the CU configuration update message includes the timing offset between the first cell and the second cell.

For beneficial effects of the communication apparatus provided in the fifth aspect and the possible implementations of the fifth aspect, refer to the beneficial effects brought by the first aspect and the possible implementations of the first aspect. Details are not described herein again.

According to a sixth aspect, an embodiment of this application provides a communication apparatus. The communication apparatus may include a receiving module and a storage module. Optionally, in some embodiments, the communication apparatus may further include a processing module.

The receiving module is configured to receive a timing offset between a first cell and a second cell from a centralized unit CU. The first cell is a cell served by a DU, the second cell is a neighboring cell of the first cell, and both the CU and the DU belong to a first access network device. The storage module is configured to store the timing offset between the first cell and the second cell.

In some embodiments, the receiving module is further configured to receive a random access channel RACH configuration of the second cell from the CU. Correspondingly, the processing module is configured to determine, based on the timing offset between the first cell and the second cell, the RACH configuration of the second cell, and a RACH configuration of the first cell, whether there is a conflict between the RACH configuration of the first cell and the RACH configuration of the second cell. In this implementation, the processing module may be further configured to: when there is the conflict between the RACH configuration of the first cell and the RACH configuration of the second cell, reconfigure a RACH configuration for the first cell.

For beneficial effects of the communication apparatus provided in the sixth aspect and the possible implementations of the sixth aspect, refer to the beneficial effects brought by the second aspect and the possible implementations of the second aspect. Details are not described herein again.

According to a seventh aspect, an embodiment of this application provides a communication apparatus. The communication apparatus may include a processing module and a sending module. Optionally, the communication apparatus may further include a first receiving module and/or a second receiving module.

The processing module is configured to obtain a first RACH configuration of a second cell. The first RACH configuration of the second cell is based on timing of a first cell. The first cell is a cell served by a distributed unit DU, the second cell is a neighboring cell of the first cell, and both a CU and the DU belong to a first access network device.

For example, the processing module may be configured to obtain a timing offset between the first cell and the second cell and a second RACH configuration of the second cell, and convert the second RACH configuration of the second cell into the first RACH configuration of the second cell based on the timing offset between the first cell and the second cell. The second RACH configuration of the second cell is based on timing of the second cell.

The timing offset between the first cell and the second cell means an offset between the timing of the two cells. For example, the timing offset may include: a frame number offset and a frame boundary offset between the first cell and the second cell, a frame number offset, a subframe number offset, and a subframe boundary offset between the first cell and the second cell, a time offset, relative to a frame boundary of a same frame, between the first cell and the second cell, or the like. For example, the processing module may obtain the timing offset between the first cell and the second cell by using the timing offset that is between the first cell and the second cell and that is received by the first receiving module from a terminal device. In this case, the processing module and the first receiving module may alternatively be integrated into the processing module or the first receiving module. Alternatively, when the second cell is a cell served by a second access network device, the processing module may obtain the timing offset between the first cell and the second cell by using the timing offset that is between the first cell and the second cell and that is received by the first receiving module from the second access network device. In this case, the processing module and the first receiving module may alternatively be integrated into the processing module or the first receiving module.

For another example, when the second cell is a cell served by a second access network device, the processing module may receive the first RACH configuration of the second cell from the second access network device via the first receiving module. In a possible implementation, the processing module may receive, via the first receiving module, a RACH configuration of the second cell and first indication information from the second access network device, where the first indication information indicates that the RACH configuration of the second cell is a RACH configuration that is based on the timing of the first cell.

The sending module is configured to send the first RACH configuration of the second cell to the DU.

For example, the second receiving module is configured to receive a request message from the DU, where the request message is for requesting to obtain the RACH configuration of the second cell. Correspondingly, the sending module is specifically configured to send the first RACH configuration of the second cell to the DU based on the request message. Optionally, the request message carries an identifier of the first cell.

Alternatively, the second receiving module is configured to receive an F1 setup request message from the DU. Correspondingly, the sending module is specifically configured to send an F1 setup response message to the DU, where the F1 setup response message includes the first RACH configuration of the second cell.

Alternatively, the sending module is specifically configured to send a CU configuration update message to the DU, where the CU configuration update message includes the first RACH configuration of the second cell.

Optionally, the sending module is specifically configured to send the RACH configuration of the second cell and second indication information to the DU. The second indication information indicates that the RACH configuration of the second cell is the RACH configuration that is based on the timing of the first cell.

For beneficial effects of the communication apparatus provided in the seventh aspect and the possible implementations of the seventh aspect, refer to the beneficial effects brought by the third aspect and the possible implementations of the third aspect. Details are not described herein again.

According to an eighth aspect, an embodiment of this application provides a communication apparatus. The communication apparatus may include a receiving module and a storage module. Optionally, in some embodiments, the communication apparatus may further include a processing module.

The receiving module is configured to receive a first RACH configuration of a second cell from a centralized unit CU. The first RACH configuration of the second cell is based on timing of a first cell, the first cell is a cell served by a DU, the second cell is a neighboring cell of the first cell, and both the CU and the DU belong to a first access network device. The storage module is configured to store the first RACH configuration of the second cell.

In this implementation, in some embodiments, the processing module is configured to determine, based on the first RACH configuration of the second cell and a RACH configuration of the first cell, whether there is a conflict between the RACH configuration of the first cell and the first RACH configuration of the second cell. In this implementation, the processing module is further configured to: when there is the conflict between the RACH configuration of the first cell and the first RACH configuration of the second cell, reconfigure a RACH configuration for the first cell.

For beneficial effects of the communication apparatus provided in the eighth aspect and the possible implementations of the eighth aspect, refer to the beneficial effects brought by the fourth aspect and the possible implementations of the fourth aspect. Details are not described herein again.

According to a ninth aspect, an embodiment of this application provides a communication method. The method may be applied to a second access network device, may be applied to a CU of the second access network device, or may be applied to a chip in the CU. The following describes the method by using an example in which the method is applied to the second access network device.

In this method, the second access network device obtains a first RACH configuration of a second cell. The first RACH configuration of the second cell is based on timing of a first cell, the second cell is a cell served by the second access network device, the first cell is a cell served by a distributed unit DU, the second cell is a neighboring cell of the first cell, and both a CU and the DU belong to a first access network device. Then, the second access network device sends the first RACH configuration of the second cell to the CU. For descriptions of the first cell and the second cell, refer to the first aspect.

Optionally, the second access network device may obtain the first RACH configuration of the second cell in the following manner. For example, the second access network device obtains a timing offset between the first cell and the second cell, and a second RACH configuration of the second cell. The second RACH configuration of the second cell is based on timing of the second cell. Then, the second access network device converts the second RACH configuration of the second cell into the first RACH configuration of the second cell based on the timing offset between the first cell and the second cell.

The timing offset between the first cell and the second cell means an offset between the timing of the two cells. For example, the timing offset may include: a frame number offset and a frame boundary offset between the first cell and the second cell, a frame number offset, a subframe number offset, and a subframe boundary offset between the first cell and the second cell, a time offset, relative to a frame boundary of a same frame, between the first cell and the second cell, or the like.

Optionally, the second access network device may obtain the timing offset between the first cell and the second cell in the following two manners: The second access network device receives the timing offset between the first cell and the second cell from a terminal device; or the second access network device receives the timing offset between the first cell and the second cell from the CU.

In some embodiments, the second access network device may have no timing offset between the first cell and the second cell. In this scenario, the second access network device may not perform the RACH configuration conversion operation, but send the second RACH configuration of the second cell to the CU of the first access network device. Therefore, to enable the CU of the first access network device to accurately learn that a received RACH configuration of the second cell is a RACH configuration that is based on timing of a specific cell, that the second access network device sends the first RACH configuration of the second cell to the CU includes: The second access network device sends a RACH configuration of the second cell and first indication information to the CU. The first indication information indicates that the RACH configuration of the second cell is a RACH configuration that is based on the timing of the first cell.

For beneficial effects of the communication method provided in the ninth aspect and the possible implementations of the ninth aspect, refer to the beneficial effects brought by the third aspect and the possible implementations of the third aspect. Details are not described herein again.

According to a tenth aspect, an embodiment of this application provides a communication apparatus. The communication apparatus may include a processing module and a sending module. Optionally, in some embodiments, the communication apparatus may further include a receiving module.

The processing module is configured to obtain a first RACH configuration of a second cell. The first RACH configuration of the second cell is based on timing of a first cell, the second cell is a cell served by a second access network device, the first cell is a cell served by a distributed unit DU, the second cell is a neighboring cell of the first cell, and both a CU and the DU belong to a first access network device.

For example, the processing module may be configured to obtain a timing offset between the first cell and the second cell and a second RACH configuration of the second cell, and convert the second RACH configuration of the second cell into the first RACH configuration of the second cell based on the timing offset between the first cell and the second cell. The second RACH configuration of the second cell is based on timing of the second cell.

The timing offset between the first cell and the second cell means an offset between the timing of the two cells. For example, the timing offset may include: a frame number offset and a frame boundary offset between the first cell and the second cell, a frame number offset, a subframe number offset, and a subframe boundary offset between the first cell and the second cell, a time offset, relative to a frame boundary of a same frame, between the first cell and the second cell, or the like. For example, the processing module may obtain the first RACH configuration of the second cell by using the timing offset that is between the first cell and the second cell and that is received by the receiving module from a terminal device. Alternatively, the processing module may obtain the first RACH configuration of the second cell by using the timing offset that is between the first cell and the second cell and that is received by the receiving module from the CU.

The sending module is configured to send the first RACH configuration of the second cell to the CU. For example, the sending module is specifically configured to send a RACH configuration of the second cell and first indication information to the CU, where the first indication information indicates that the RACH configuration of the second cell is a RACH configuration that is based on the timing of the first cell.

For beneficial effects of the communication apparatus provided in the tenth aspect and the possible implementations of the tenth aspect, refer to the beneficial effects brought by the ninth aspect and the possible implementations of the ninth aspect. Details are not described herein again.

According to an eleventh aspect, an embodiment of this application provides a communication apparatus. The communication apparatus includes a processor, a memory, and a communication port. The communication apparatus implements receiving and sending through a communication port.

The memory is configured to store computer-executable program code, and the program code includes instructions. When the processor executes the instructions, the instructions enable the communication apparatus to perform the method according to any one of the first aspect to the fourth aspect or the ninth aspect.

According to a twelfth aspect, an embodiment of this application provides a communication apparatus. The communication apparatus includes: the CU described in the first aspect and the DU described in the second aspect; the CU described in the third aspect and the DU described in the fourth aspect; the communication apparatus described in the fifth aspect and the communication apparatus described in the sixth aspect; the communication apparatus described in the seventh aspect and the communication apparatus described in the eighth aspect; or the communication apparatus described in the eleventh aspect. In some embodiments, the communication apparatus may be referred to as, for example, a radio access network device.

According to a thirteenth aspect, an embodiment of this application provides a communication system. The communication system may include: the CU described in the first aspect and the DU described in the second aspect; the CU described in the third aspect and the DU described in the fourth aspect; the communication apparatus described in the fifth aspect and the communication apparatus described in the sixth aspect; the communication apparatus described in the seventh aspect and the communication apparatus described in the eighth aspect; the second access network device described in the ninth aspect; the communication apparatus described in the tenth aspect; the communication apparatus described in the eleventh aspect; the CU of the first access network device described in the third aspect, the DU of the first access network device described in the fourth aspect, and the second access network device described in the ninth aspect; or the communication apparatus described in the seventh aspect, the communication apparatus described in the eighth aspect, and the communication apparatus described in the tenth aspect.

According to a fourteenth aspect, an embodiment of this application provides a chip. The chip stores a computer program. When the computer program is executed by the chip, the method described in any one of the first aspect to the fourth aspect or the ninth aspect is implemented.

According to a fifteenth aspect, an embodiment of this application provides a communication apparatus, including units, modules, or circuits configured to perform the method provided in the first aspect or the possible implementations of the first aspect, the third aspect or the possible implementations of the third aspect, or the ninth aspect or the possible implementations of the ninth aspect. The communication apparatus may be a CU, or may be a module applied to a CU, for example, a chip applied to a CU.

According to a sixteenth aspect, an embodiment of this application provides a communication apparatus, including units, modules, or circuits configured to perform the method provided in the second aspect or the possible implementations of the second aspect or the fourth aspect or the possible implementations of the fourth aspect. The communication apparatus may be a DU, or may be a module applied to a DU, for example, a chip applied to a DU.

According to a seventeenth aspect, an embodiment of this application provides a computer-readable storage medium, configured to store a computer program or instructions. When the computer program or the instructions are run on a computer, the computer is enabled to perform the method according to any one of the first aspect to the fourth aspect or the ninth aspect.

According to an eighteenth aspect, an embodiment of this application provides a computer program product. When the computer program product runs on a computer, the computer is enabled to perform the method according to any one of the first aspect to the fourth aspect.

According to a nineteenth aspect, an embodiment of this application provides a computer program product including instructions. When the computer program product runs on a computer, the computer is enabled to perform the method according to any one of the first aspect to the fourth aspect or the ninth aspect.

The communication method and an apparatus are provided in embodiments of this application. When a cell served by a DU of an access network device and a neighboring cell use different timing, the DU may obtain timing configurations of a first cell and a second cell, or a RACH configuration that is of a second cell and that is based on timing of a first cell. When the method is applied to a RACH optimization scenario, the DU may determine, at same timing, RACH configurations of the two cells based on the foregoing obtained information, to accurately identify whether a RACH configuration conflict occurs between the cell and the neighboring cell, optimize the RACH configuration of the cell when the conflict occurs, and ensure a success rate and an access latency of random access performed by a terminal device.

DESCRIPTION OF EMBODIMENTS

Figure 1:
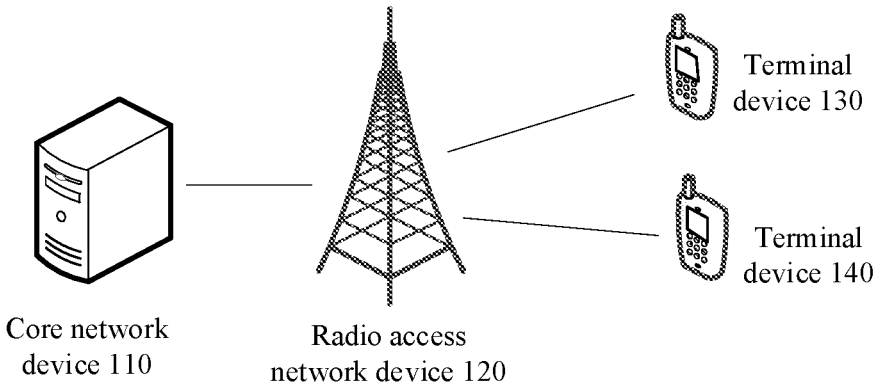
FIG. 1 is a schematic diagram of an architecture of a mobile communication system to which embodiments of this application are applied.

FIG. 1 is a schematic diagram of an architecture of a mobile communication system to which embodiments of this application are applied. As shown in FIG. 1, the mobile communication system may include a core network device 110, a radio access network (RAN) device 120, and at least one terminal device (for example, a terminal device 130 and a terminal device 140 in FIG. 1). The terminal device is connected to the radio access network device 120 in a wireless manner, and the radio access network device 120 is connected to the core network device 110 in a wireless or wired manner. The core network device 110 and the radio access network device 120 may be different independent physical devices, or functions of the core network device 110 and logical functions of the radio access network device 120 may be integrated on a same physical device, or some of functions of the core network device 110 and some of functions of the radio access network device 120 may be integrated on one physical device. The terminal device may be located at a fixed position, or may be mobile. FIG. 1 is only a schematic diagram, and the mobile communication system may further include another network device, for example, may further include a wireless relay device and a wireless backhaul device. The another network device is not shown in FIG. 1. A quantity of core network devices 110, radio access network devices 120, and terminal devices included in the mobile communication system is not limited in embodiments of this application.

The radio access network device 120 is an access device used by a terminal device to access the mobile communication system in a wireless manner, and may be a base station NodeB, an evolved NodeB (eNB or eNodeB), a base station (for example, a gNB or a ng-eNB) in a 5G mobile communication system or a new radio (NR) communication system, a base station in a future mobile communication system, an access node in a Wi-Fi system, a relay station, or the like. A specific technology and a specific device form used by the radio access network device 120 are not limited in embodiments of this application. In embodiments of this application, the radio access network device 120 is referred to as an access network device for short. Unless otherwise specified, in embodiments of this application, the access network device is the radio access network devices 120. In addition, the term 5G may be equivalent to NR in embodiments of this application.

The terminal device may also be referred to as a terminal, user equipment (UE), a mobile station (MS), a mobile terminal (MT), or the like. The terminal device may be a mobile phone, a tablet computer (pad), a computer having a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

The radio access network device 120 and the terminal device may be deployed on land, and include an indoor or outdoor device, a handheld device, or a vehicle-mounted device; or may be deployed on water; or may be deployed on a plane, a balloon, and a satellite in the air. An application scenario of the radio access network device 120 and the terminal device is not limited in embodiments of this application.

The radio access network device 120 and the terminal device may communicate with each other by using a licensed spectrum, an unlicensed spectrum, or both a licensed spectrum and an unlicensed spectrum. The radio access network device 120 and the terminal device may communicate with each other by using a spectrum below 6 gigahertz (GHz), a spectrum above 6 GHz, or both a spectrum below 6 GHz and a spectrum above 6 GHz. A spectrum resource used between the radio access network device 120 and the terminal device is not limited in embodiments of this application.

Figure 2:
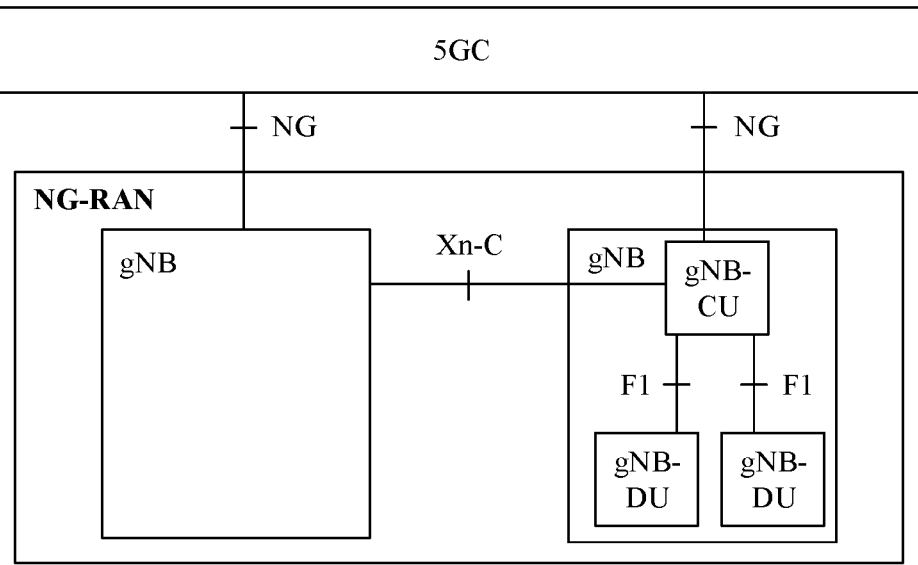
FIG. 2 is a schematic diagram of an architecture of a 5G communication system.

A 5G communication system is used as an example. FIG. 2 is a schematic diagram of an architecture of a 5G communication system. As shown in FIG. 2, the 5G communication system includes a next generation radio access network (NG-RAN) including a plurality of access network devices and a 5G core (5GC) network including a plurality of core network devices.

In a possible manner, the access network device in the NG-RAN may be an access network device in an architecture in which a centralized unit (CU) and a distributed unit (DU) are split. It may be understood that the access network device is divided into the CU and the DU from a perspective of logical function. The CU and the DU may be physically split or deployed together. A plurality of DUs may share one CU, and one DU may serve a plurality of cells. The CU and the DU may be connected through an F1 interface. The CU may be connected, on behalf of the access network device, to the 5GC through an NG interface, and may be connected, on behalf of the access network device, to another access network device through an Xn interface (for example, an Xn-C (control plane) interface).

Optionally, functions of the CU and the DU may be divided based on a protocol layer of a wireless network. For example, functions of a radio resource control (RRC) layer, a service data adaptation protocol (SDAP) layer, and a packet data convergence protocol (PDCP) layer are set on the CU, and functions of a radio link control (RLC) layer, a media access control (MAC) layer, a physical (PHY) layer, and the like are set on the DU. It may be understood that, division of the functions of the CU and the DU based on the protocol layer is merely an example, and the functions of the CU and the DU may alternatively be divided in another manner. For example, the CU or the DU may have functions of more protocol layers, or the CU or the DU may have some processing functions of a protocol layer. For example, some functions of the RLC layer and a function of a protocol layer above the RLC layer are set on the CU, and remaining functions of the RLC layer and a function of a protocol layer below the RLC layer are set on the DU.

Alternatively, the functions of the CU and the DU may be divided based on a service type or another system requirement. For example, division is performed based on a latency. A function whose processing time needs to meet a latency requirement is set on the DU, and a function whose processing time does not need to meet the latency requirement is set on the CU.

Alternatively, the CU may have one or more functions of the core network. One or more CUs may be disposed in a centralized manner or a split manner. For example, the CUs may be disposed on a network side for ease of centralized management. The DU may have a plurality of radio frequency functions, or the radio frequency functions may be disposed remotely.

Figure 3:
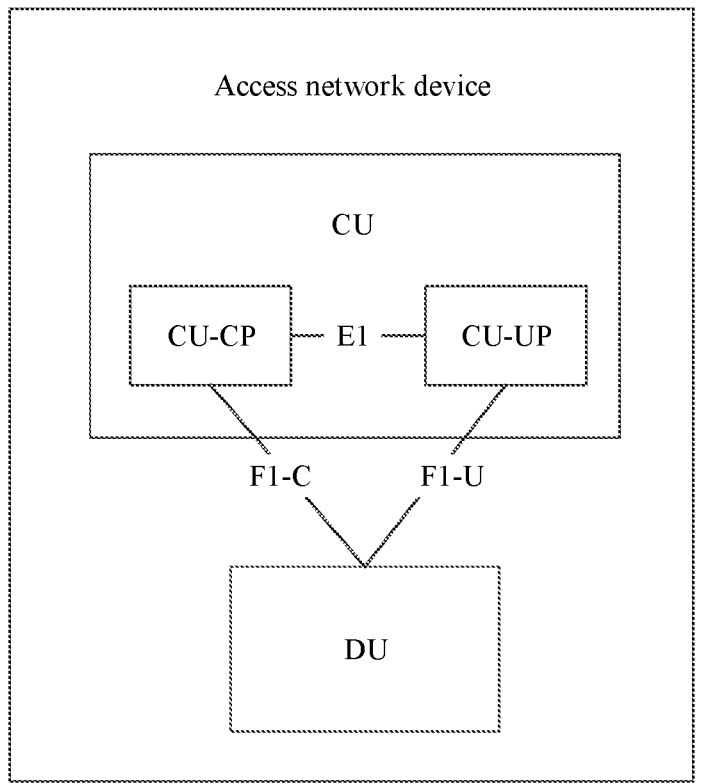
FIG. 3 is a schematic diagram of an access network device.

It should be understood that the functions of the CU may be implemented by a single entity, or may be implemented by different entities. Optionally, the functions of the CU may be further divided. For example, FIG. 3 is a schematic diagram of an access network device. As shown in FIG. 3, a control plane (CP) and a user plane (UP) of a CU, namely, a control plane of the CU (CU-CP) and a user plane of the CU (CU-UP), may be split. The CU-CP and the CU-UP may be implemented by different function entities. The CU-CP and the CU-UP may be coupled to a DU to jointly implement functions of an access network device. In a possible manner, the CU-CP is responsible for control plane functions, including a function of an RRC layer and a function of a PDCP-C. The PDCP-C is mainly responsible for encryption and decryption, integrity protection, data transmission, and the like of control plane data. The CU-UP is responsible for user plane functions, including a function of an SDAP layer and a function of a PDCP-U. The PDCP-U is mainly responsible for encryption and decryption, integrity protection, header compression, serial number maintenance, data transmission, and the like of a data plane. The CU-CP and the CU-UP may be connected through an E1 interface. The CU-CP may be connected, on behalf of the access network device, to a core network device through an NG interface, and connected to the DU through an F1-C (control plane). The CU-UP is connected to the DU through an F1-U (user plane). Optionally, in another possible implementation, the function of the PDCP-C is also set on the CU-UP side.

There are the following two cases for a cell in a 5G communication system.

Case 1: Two cells use same timing (in other words, use a same timing reference), that is, "time" of the two cells is synchronized. In other words, frame boundaries of the two cells are aligned (where the frame boundaries being aligned means that subframe boundaries are aligned and subframe numbers are synchronized), and frame numbers are synchronized.

Case 2: Two cells use different timing (in other words, use different timing references), that is, "time" of the two cells is not synchronized. The following cases are included: Frame boundaries are aligned but frame numbers are not synchronized; or frame boundaries are not aligned (where it is impossible for frame numbers to be synchronized when the frame boundaries are not aligned, that is, when frames overlap).

Time units in time domain in the 5G communication system include a frame and a subframe. One frame occupies 10 milliseconds, a frame number starts from 0, and each cycle includes 1024 frame numbers. One frame includes 10 subframes, and each subframe occupies 1 millisecond. The following uses an example in which the frame and the subframe are used, to describe the foregoing two cases.

In this example, when two cells use same timing, that "time" of the two cells is synchronized may be shown in the following Table 1.

TABLE 1

| Number | Frame boundary | Frame number |
|--------|----------------|--------------|
| 1 | Aligned | Synchronized |

Figure 4:
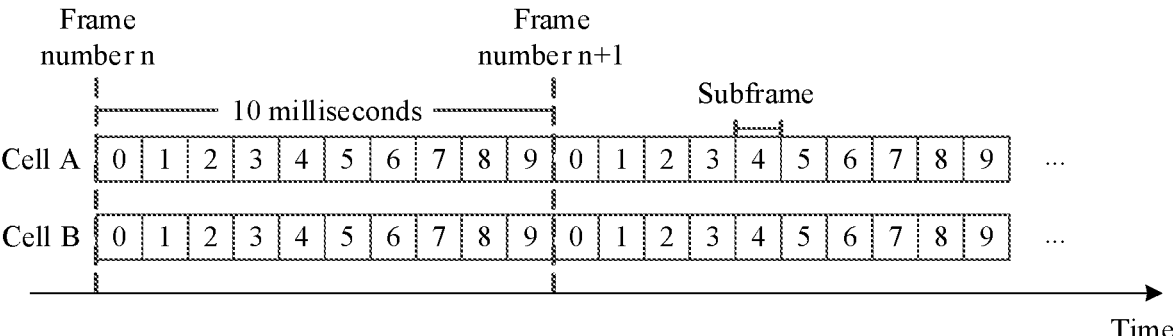
FIG. 4 is a schematic diagram of a time domain resource.

FIG. 4 is a schematic diagram of a time domain resource. A cell A and a cell B that are neighboring cells are used as an example (where it should be understood that the two neighboring cells herein refer to two cells that are adjacent to each other, for example, coverage of the two cells is partially the same, and one of the cells may be referred to as a neighboring cell of the other cell). As shown in FIG. 4, when the cell A and the cell B use same timing, the two cells correspond to a frame number n at a same moment, and frame boundaries that are of the two cells and whose frame numbers are n are aligned.

When two cells use different timing, that "time" of the two cells is not synchronized may be shown in the following Table 2.

TABLE 2

| Number | Frame boundary | Frame number | Subframe boundary | Subframe number |
|--------|----------------|--------------|-------------------|-----------------|
| 1 | Aligned | Not synchronized | Aligned | Synchronized |
| 2 | Not aligned | Not synchronized | Aligned | Not synchronized |
| 3 | Not aligned | Not synchronized | Not aligned | Not synchronized |

Figure 5:
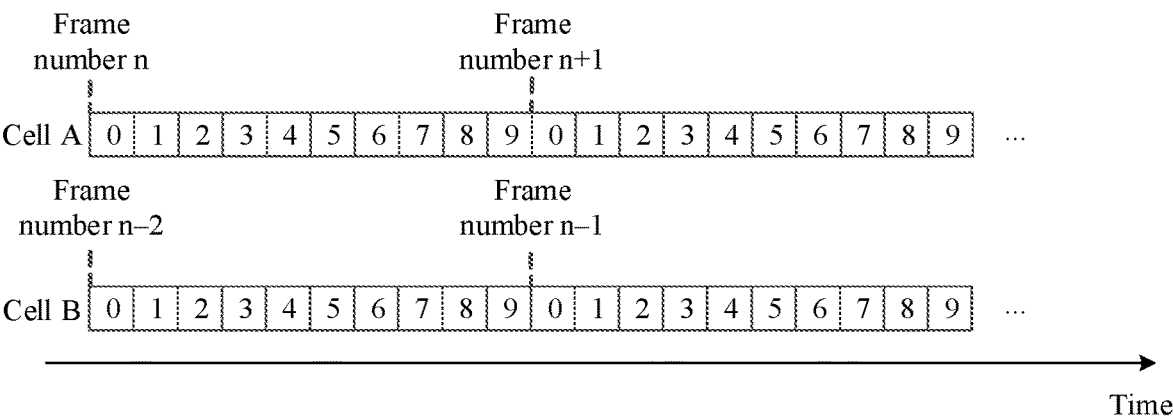
FIG. 5 is a schematic diagram 1 of another time domain resource.
Figure 6:
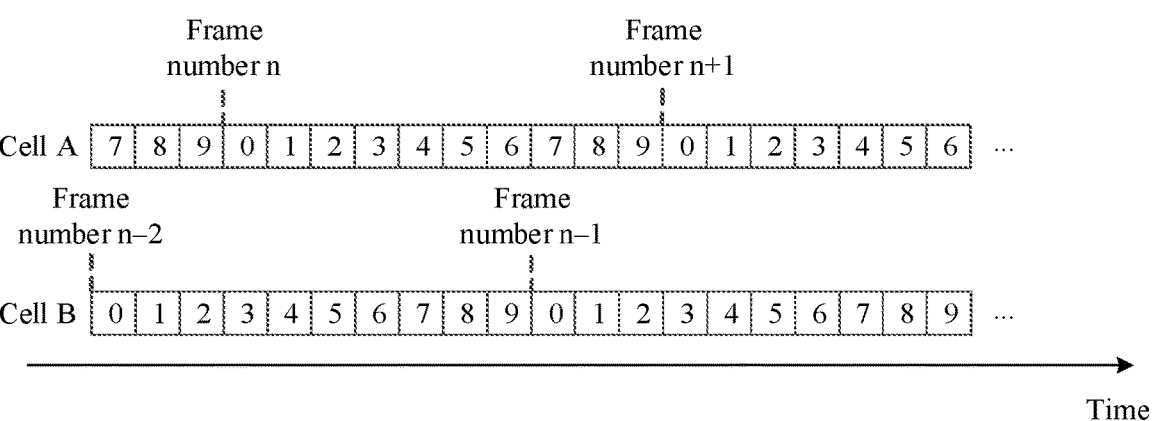
FIG. 6 is a schematic diagram 2 of another time domain resource.
Figure 7:
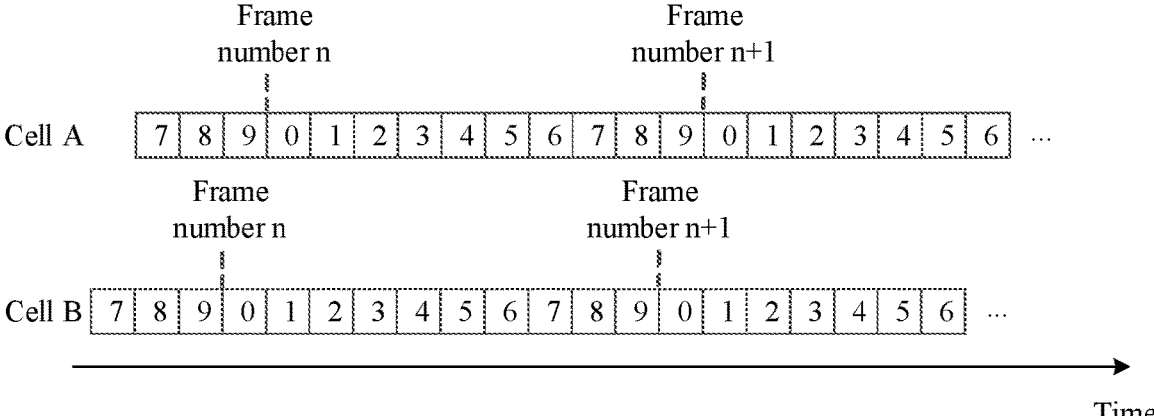
FIG. 7 is a schematic diagram 3 of another time domain resource.
Figure 8:
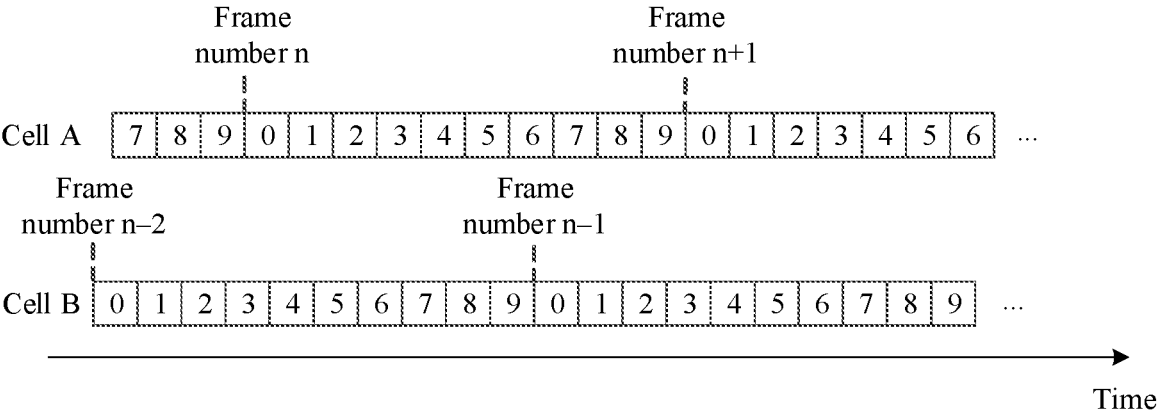
FIG. 8 is a schematic diagram 4 of another time domain resource.
Figure 9:
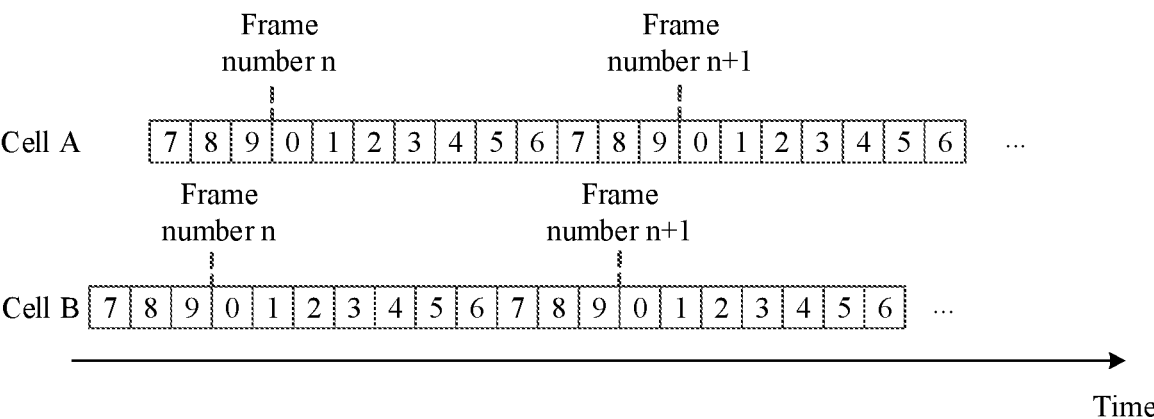
FIG. 9 is a schematic diagram 5 of another time domain resource.

FIG. 5 is a schematic diagram 1 of another time domain resource; FIG. 6 is a schematic diagram 2 of another time domain resource; FIG. 7 is a schematic diagram 3 of another time domain resource; FIG. 8 is a schematic diagram 4 of another time domain resource; and FIG. 9 is a schematic diagram 5 of another time domain resource. A cell A and a cell B that are neighboring cells are still used as an example. When the cell A and the cell B use different timing: If that "time" of the two cells is not synchronized corresponds to a case shown in number 1 in Table 2, a frame relationship between the cell A and the cell B may be shown in FIG. 5. If that "time" of the two cells is not synchronized corresponds to a case shown in number 2 in Table 2, a frame relationship between the cell A and the cell B may be shown in FIG. 6 or FIG. 7. If that "time" of the two cells is not synchronized corresponds to a case shown in number 3 in Table 2, a frame relationship between the cell A and the cell B may be shown in FIG. 8 or FIG. 9.

It should be understood that Table 1 and Table 2 are merely examples. When the time unit is divided at a finer granularity (for example, a symbol or a slot), a time relationship between the two neighboring cells may be further refined. That is, when the two neighboring cells use the same timing, numbers of time units of a finest granularity of the two cells are the same, and boundaries are aligned. When two neighboring cells use different timing, numbers of time units of at least one granularity of the two cells are different and/or boundaries are not aligned, for example, including at least one of the following cases: Frame numbers are not synchronized, subframe numbers are not synchronized, slot numbers are not synchronized, symbol numbers are not synchronized, frame boundaries are not aligned, subframe boundaries are not aligned, slot boundaries are not aligned, symbol boundaries are not aligned, or the like.

A self-organized network (SON) is a concept proposed during long term evolution (LTE) standardization. The technology is introduced to automatically complete parameter configuration and optimization of a cellular mobile communication network device, reduce manual participation in a network operation and management process, improve network reliability, and reduce operation costs. The 5G communication system also supports an SON mechanism. The SON mainly includes three functions: self-configuration, self-optimization, and self-healing. The self-optimization enables a network device to automatically adjust a radio parameter (for example, transmit power, a handover threshold, and a cell-specific offset) based on a network running status, to optimize network performance. The self-optimization mainly includes mobility load balancing (MLB), random access channel (RACH) optimization, and mobility robustness optimization (MRO).

A RACH configuration of a cell is mainly a physical random access channel (PRACH) configuration, and may include a configuration parameter related to a PRACH preamble sequence and a format, a configuration parameter related to a PRACH time domain resource, a configuration parameter related to a PRACH frequency domain resource, and the like. In embodiments of this application, a RACH configuration may be replaced with a PRACH configuration, and the PRACH configuration also falls within the protection scope of the present invention. For ease of description, the following uses the RACH configuration as an example for description.

If the RACH configuration of the cell is not properly configured, leading to a conflict between the RACH configuration of the cell and a RACH configuration of a neighboring cell of the cell, a problem such as random access preamble confusion between the cell and the neighboring cell easily arises. Consequently, terminal devices served by the cell and the neighboring cell fail to perform access, a false alarm is caused, signaling load of an access network device is increased, or the like. Therefore, the RACH optimization in the self-optimization aims to avoid the conflict with the RACH configuration of the neighboring cell by adjusting the RACH configuration of the cell, to ensure a success rate and an access latency of random access performed by a terminal device to the cell.

As described above, for the access network device in the CU/DU architecture shown in FIG. 2, it is currently proposed that a RACH configuration of a cell be determined by a DU to which the cell belongs. In other words, the DU sets the RACH configuration of the cell served by the DU and performs RACH optimization.

The following uses an example to describe a process in which the DU performs RACH optimization.

A cell 1 served by a DU of an access network device A is used as an example, and a neighboring cell of the cell 1 is a cell 2. The DU of the access network device A may determine, based on a RACH configuration of the cell 1 and a RACH configuration of the cell 2, whether there is a conflict between the RACH configurations of the two cells. If there is the conflict between the RACH configuration of the cell 1 and the RACH configuration of the cell 2, optionally, the DU of the access network device A may optimize the RACH configuration of the cell 1, to ensure a success rate and an access latency of random access performed by a terminal device to the cell 1. For example, the DU of the access network device A may change some or all parameters in the RACH configuration of the cell 1, to avoid the conflict with the RACH configuration of the cell 2.

When the RACH optimization is performed in the foregoing manner, if the cell 1 and the cell 2 use same timing, that is, "time" of the two cells is synchronized, the DU of the access network device A may accurately identify, based on the RACH configuration of the cell 1 and the RACH configuration of the cell 2, whether there is the conflict between the RACH configuration of the cell 1 and the RACH configuration of the cell 2.

If the cell 1 and the cell 2 use different timing, that is, "time" of the two cells is not synchronized, the RACH configuration that is of the cell 2 and that is obtained by the DU of the access network device A is a RACH configuration that is based on timing of the cell 2, and the RACH configuration of the cell 1 is a RACH configuration that is based on timing of the cell 1. In this case, even if the RACH configuration of the cell 1 and the RACH configuration of the cell 2 are the same, because the timing of the cell 1 and the cell 2 is different, a problem of a RACH configuration conflict may not exist. Alternatively, even if the RACH configuration of the cell 1 and the RACH configuration of the cell 2 are different, a problem of a RACH configuration conflict may exist because the timing of the cell 1 and the cell 2 is different. Consequently, the DU of the access network device A cannot identify whether there is the conflict between the RACH configuration of the cell 1 and the RACH configuration of the cell 2.

Figure 10:
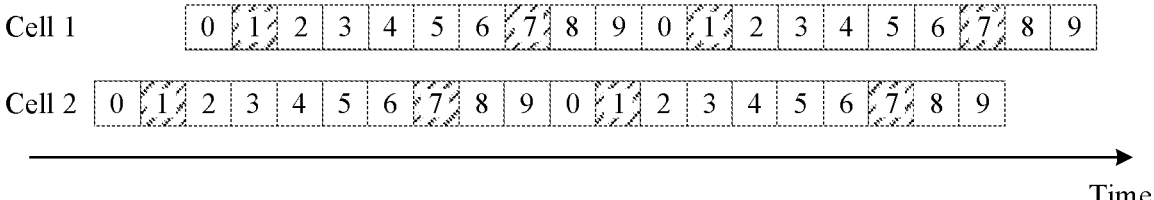
FIG. 10 is a schematic diagram of a RACH time domain resource.

FIG. 10 is a schematic diagram of a RACH time domain resource. As shown in FIG. 10, for example, a time domain configuration of a RACH resource of a cell 1 is the same as a time domain configuration of a RACH resource of a cell 2, that is, a terminal device is allowed to send RACHs in the $1^{st}$ subframe and the $7^{th}$ subframe of each frame. It is assumed that an offset between timing of the cell 1 and timing of the cell 2 is two subframes. In this case, although a RACH configuration of the cell 1 is the same as a RACH configuration of the cell 2, a subframe in which a RACH is allowed to be sent in the cell 1 and a subframe in which a RACH is allowed to be sent in the cell 2 do not overlap in terms of time because the timing of the cell 1 and the cell 2 is different. In this case, there is no conflict between the RACH configurations of the two cells.

Figure 11:
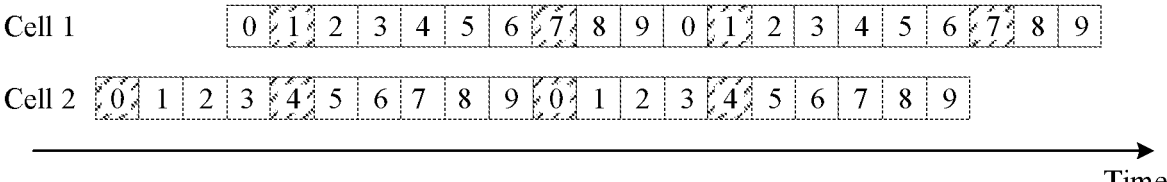
FIG. 11 is a schematic diagram of another RACH time domain resource.

FIG. 11 is a schematic diagram of another RACH time domain resource. As shown in FIG. 11, for example, a time domain configuration of a RACH resource of a cell 1 is different from a time domain configuration of a RACH resource of a cell 2. The cell 1 allows a terminal device to send RACHs in the $1^{st}$ subframe and the $7^{th}$ subframe of each frame. The cell 2 allows the terminal device to send RACHs in the $0^{th}$ subframe and the $4^{th}$ subframe of each frame. It is assumed that an offset between timing of the cell 1 and timing of the cell 2 is three subframes. In this case, although a RACH configuration of the cell 1 is different from a RACH configuration of the cell 2, a subframe 1 in which a RACH is allowed to be sent in the cell 1 and a subframe 4 in which a RACH is allowed to be sent in the cell 2 overlap in terms of time because the timing of the cell 1 and the cell 2 is different, resulting in a conflict between the RACH configurations of the two cells.

In conclusion, when a cell served by a DU and a neighboring cell use different timing, the DU cannot identify whether there is a conflict between a RACH configuration of the cell and a RACH configuration of the neighboring cell, and therefore cannot optimize the RACH configuration of the cell.

In consideration of the foregoing problem, embodiments of this application provide a communication method. When a cell served by a DU and a neighboring cell use different timing, the DU obtains a RACH configuration that is of the neighboring cell and that is based on timing of the cell served by the DU, so that the DU can accurately identify whether there is a conflict between a RACH configuration of the cell served by the DU and the RACH configuration of the neighboring cell. It should be understood that the method provided in embodiments of this application is applicable to any communication system that has the foregoing problem, including but not limited to a 5G communication system.

The following uses a first CU and a first DU of a first access network device as an example to describe in detail the technical solutions in embodiments of this application with reference to specific embodiments. The following specific embodiments may be combined with each other, and a same or similar concept or process may not be described repeatedly in some embodiments. It should be understood that when the first access network device includes a plurality of DUs, the first DU may be any DU of the first access network device. In addition, if the first access network device is in the architecture shown in FIG. 3, the method in embodiments of this application may be implemented through interaction between a first CU-CP and a first DU of the first access network device. For ease of description, the first CU is used as an example for description in the following embodiments.

Figure 12:
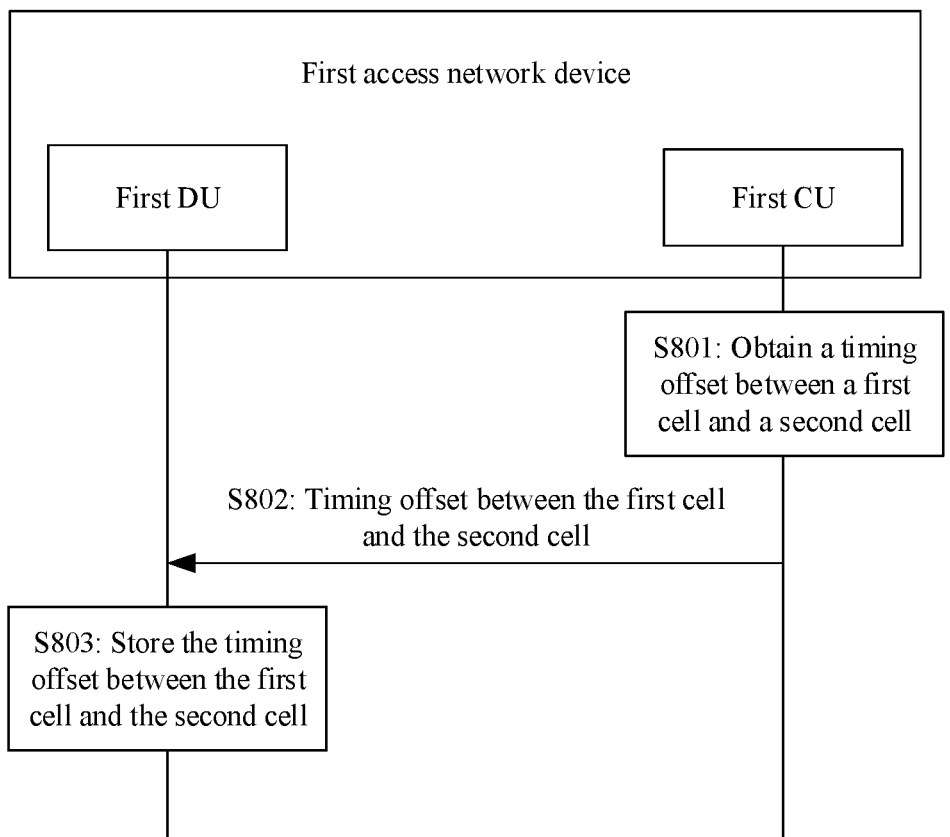
FIG. 12 is a schematic flowchart of a communication method according to an embodiment of this application.

FIG. 12 is a schematic flowchart of a communication method according to an embodiment of this application. In this embodiment, a RACH optimization scenario is used as an example to describe how a first DU of a first access network device obtains a timing offset between a cell served by the first DU and a neighboring cell. As shown in FIG. 12, the method may include the following steps.

S801: A first CU obtains a timing offset between a first cell and a second cell.

S802: The first CU sends the timing offset between the first cell and the second cell to a first DU.

Accordingly, the first DU receives the timing offset between the first cell and the second cell.

S803: The first DU stores the timing offset between the first cell and the second cell. This step is optional. For example, the first DU may store the timing offset between the first cell and the second cell, and delete the timing offset when maximum storage duration is reached. Alternatively, when receiving a timing offset that is between the first cell and the second cell and that is newly sent by the first CU, the first DU may delete a previously stored timing offset between the first cell and the second cell. Alternatively, the first DU may delete the timing offset between the first cell and the second cell after completing performing, based on the timing offset between the first cell and the second cell, a corresponding operation (for example, RACH configuration or RACH optimization).

The first cell in this embodiment is a cell served by the first DU, the second cell is a neighboring cell of the first cell, and the second cell includes at least one cell. The second cell herein may be a cell served by the first DU, or may be a cell served by another DU of the first access network device, or may be a cell served by a second access network device. An example in which the second access network device is of a CU/DU architecture is used. It is assumed that the second access network device includes a second CU and a second DU, and the second cell is a cell served by the second DU. The second access network device is at least one access network device different from the first access network device.

The timing offset between the first cell and the second cell means an offset between timing of the two cells. In the present invention, the timing offset between the first cell and the second cell may be a system frame number and frame timing difference (SFTD) between the first cell and the second cell, a system frame number and subframe timing difference (SSTD) between the first cell and the second cell, a timing offset in another time unit, or the like, and is specifically related to a division granularity of the time unit. For example, when the time unit includes a slot, the timing offset between the two cells may alternatively be a system frame number and slot timing offset between the first cell and the second cell.

For example, time units in time domain in a 5G communication system include a frame and a subframe. In this case, the timing offset between the first cell and the second cell may be described as: a frame number offset and a frame boundary offset between the first cell and the second cell at a same moment, a frame number offset, a subframe number offset, and a subframe boundary offset between the first cell and the second cell at a same moment, or a time offset, relative to a frame boundary of a same frame, between the first cell and the second cell at a same moment.

Figure 13:
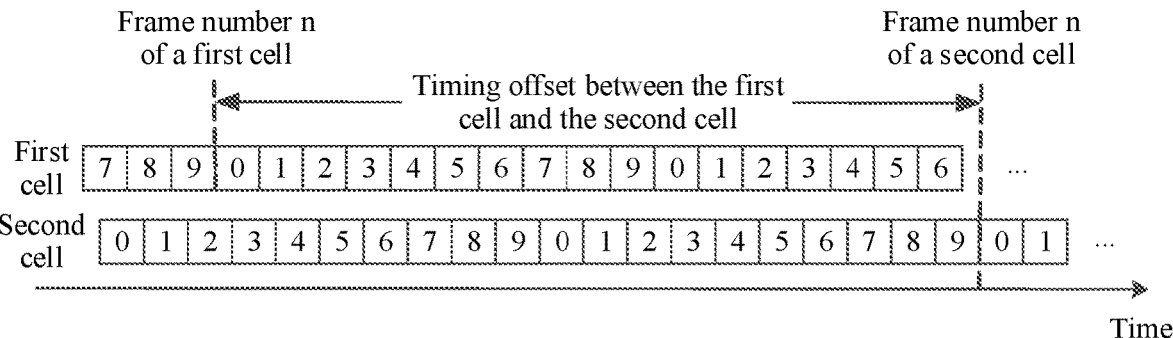
FIG. 13 is a schematic diagram of still another RACH time domain resource.

FIG. 13 is a schematic diagram of still another RACH time domain resource. As shown in FIG. 13, it is assumed that a first cell is located at a start location of the $0^{th}$ subframe of an $n^{th}$ frame at a moment x, and a second cell is located at the $4^{th}$ symbol of the $2^{nd}$ subframe of an $(n-2)^{th}$ frame at the moment x. In this case, for example, a timing offset between the first cell and the second cell may be shown in the following Table 3.

TABLE 3

| Number | Timing offset between the first cell and the second cell |
|---|---|
| 1 | A frame number of the first cell is two frame numbers earlier than a frame number of the second cell, and a frame boundary of the first cell lags behind a frame boundary of the second cell by 2.3 milliseconds. Alternatively, a frame number of the second cell is two frame numbers later than a frame number of the first cell, and a frame boundary of the second cell is 2.3 milliseconds earlier than a frame boundary of the first cell. |
| 2 | A frame number of the first cell is two frame numbers earlier than a frame number of the second cell, a subframe number of the first cell lags behind a subframe number of the second cell by three subframe numbers, and a subframe boundary of the first cell is 0.7 millisecond earlier than a subframe boundary of the second cell. |

TABLE 3-continued

| Number | Timing offset between the first cell and the second cell |
| --- | --- |
| | Alternatively, a frame number of the second cell is two frame numbers later than a frame number of the first cell, a subframe number of the second cell is three subframe numbers earlier than a subframe number of the first cell, and a subframe boundary of the second cell is 0.7 millisecond later than a subframe boundary of the first cell. |
| 3 | A frame boundary of a frame 0 of the first cell is 17.7 milliseconds earlier than a frame boundary of a frame 0 of the second cell.<br>Alternatively, a frame boundary of a frame 0 of the second cell lags behind a frame boundary of a frame 0 of the first cell by 17.7 milliseconds. |

It should be understood that Table 3 is merely an example, and an expression form of the timing offset between the first cell and the second cell includes but is not limited to the manner shown in Table 3. In addition, when a granularity of a time unit is divided at a finer granularity (for example, a symbol or a slot), the timing offset between the first cell and the second cell may be expressed in another form. This is not limited in this embodiment of this application.

A manner in which the first CU obtains the timing offset between the first cell and the second cell is not limited in this embodiment. For example, the first CU receives the timing offset between the first cell and the second cell from a terminal device. Optionally, the terminal device may be a terminal device located in coverage of both the first cell and the second cell. For example, the first CU may deliver a measurement configuration to the terminal device, to indicate the terminal device to measure the timing offset between the first cell and the second cell. The terminal device that obtains the timing offset through measurement may send, by using a measurement report, the timing offset to the first CU. It may be understood that the manner of obtaining the timing offset between the first cell and the second cell is applicable to a scenario in which the second cell may be a cell served by the first DU, or may be a cell served by another DU of the first access network device, or may be a cell served by a second access network device.

For another example, the first CU may obtain the timing offset between the first cell and the second cell based on internal implementation. For example, the first CU may monitor a broadcast signal of the second cell, and obtain the timing offset between the first cell and the second cell based on a time difference between a detected broadcast signal of the first cell and a detected broadcast signal of the second cell.

For another example, if the second cell is a cell served by the second access network device, the first CU may receive the timing offset between the first cell and the second cell from the second access network device. An example in which the second access network device is of a CU/DU architecture is used. It is assumed that the second access network device includes a second CU and a second DU, and the second cell is a cell served by the second DU. In this case, the first CU may receive the timing offset that is between the first cell and the second cell and that is sent by the second CU. It should be understood that, in this scenario, the second access network device may obtain, by sending a measurement configuration to a terminal device, the timing offset that is between the first cell and the second cell and that is measured by the terminal device. Alternatively, the second access network device may obtain the timing offset between the first cell and the second cell based on internal implementation of the second access network device. This is not limited in this embodiment. Optionally, the second access network device may send the timing offset to the first CU when obtaining the timing offset, may send the timing offset together with a RACH configuration of the second cell to the first CU when exchanging the RACH configuration with the first CU, or the like.

After obtaining the timing offset between the first cell and the second cell, for example, the first CU may send the timing offset between the first cell and the second cell to the first DU in the following manners.

Implementation 1: The first CU may send the timing offset between the first cell and the second cell to the first DU in a process of setting up an F1 interface with the first DU.

Figure 14:
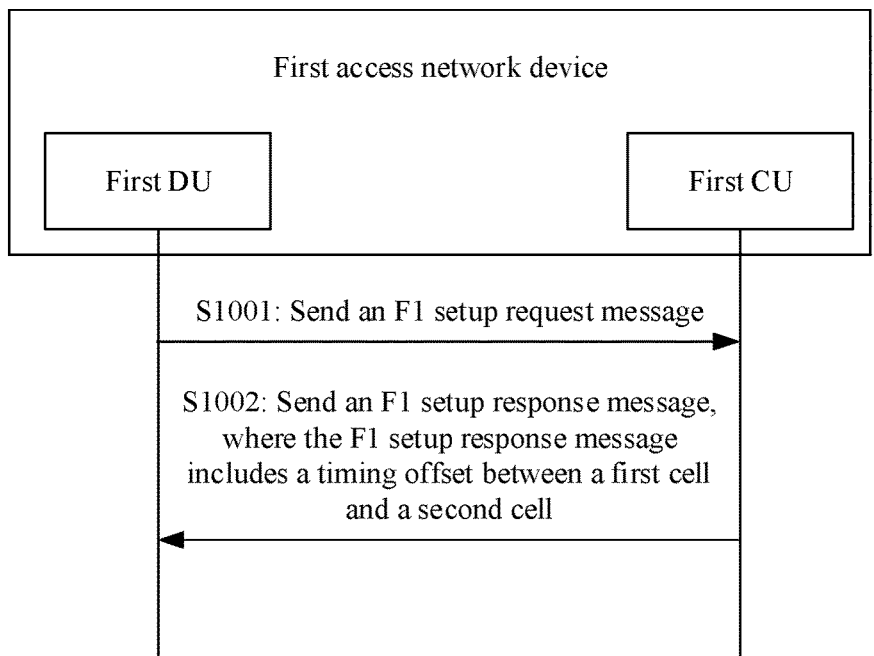
FIG. 14 is a schematic flowchart of another communication method according to an embodiment of this application.

FIG. 14 is a schematic flowchart of another communication method according to an embodiment of this application. As shown in FIG. 14, step S802 may include the following steps.

S1001: A first DU sends an F1 setup request message to a first CU.

Accordingly, the first CU receives the F1 setup request (F1 setup request) message.

S1002: The first CU sends an F1 setup response message to the first DU, where the F1 setup response message includes a timing offset between a first cell and a second cell.

Accordingly, the first DU receives the F1 setup response (F1 setup response) message. Optionally, the F1 setup response message may further include a RACH configuration of the second cell.

Optionally, the F1 setup response message may further include a timing offset that is obtained by the first CU and that is between each of some or all cells served by the first DU and a neighboring cell of the cell, namely, a timing offset that is obtained by the first CU and that is between each of a plurality of cells served by the first DU and at least one neighboring cell of the cell. Optionally, the F1 setup response message may further include RACH configurations of the neighboring cells of these cells.

For example, it is assumed that the first DU has two cells: a cell 1 and a cell 2. Neighboring cells of the cell 1 include a cell 4, a cell 5, and a cell 6. Neighboring cells of the cell 2 include a cell 7 and a cell 8. The F1 setup response message may include the following timing offsets: a timing offset between the cell 1 and the cell 4, a timing offset between the cell 1 and the cell 5, a timing offset between the cell 1 and the cell 6, a timing offset between the cell 2 and the cell 7, and a timing offset between the cell 2 and the cell 8.

Implementation 2: When obtaining the timing offset (for example, that is obtained for the first time or that is updated) between the first cell and the second cell, the first CU may actively send the timing offset between the first cell and the second cell to the first DU. For example, the first CU sends the timing offset to the first DU by using a CU configuration update message; or introduces a new message and sends the timing offset to the first DU by using the newly introduced message. The following uses the CU configuration update message as an example for description, but is not limited to this message.

Figure 15:
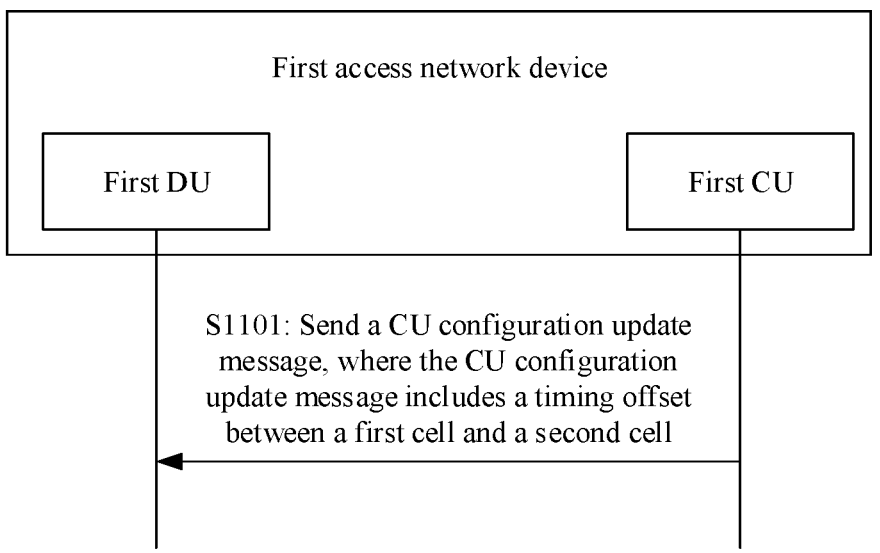
FIG. 15 is a schematic flowchart of still another communication method according to an embodiment of this application.

FIG. 15 is a schematic flowchart of still another communication method according to an embodiment of this application. As shown in FIG. 15, step S802 may include the following steps.

S1101: A first CU sends a CU configuration update message to a first DU, where the CU configuration update message includes a timing offset between a first cell and a second cell.

Accordingly, the first DU receives the CU configuration update message.

For example, after obtaining an updated RACH configuration of the second cell, the first CU may send the timing offset between the first cell and the second cell to the first DU by using the CU configuration update message. Optionally, the CU configuration update message may further include the updated RACH configuration of the second cell.

Implementation 3: The first DU actively requests to obtain the timing offset between the first cell and the second cell.

Figure 16:
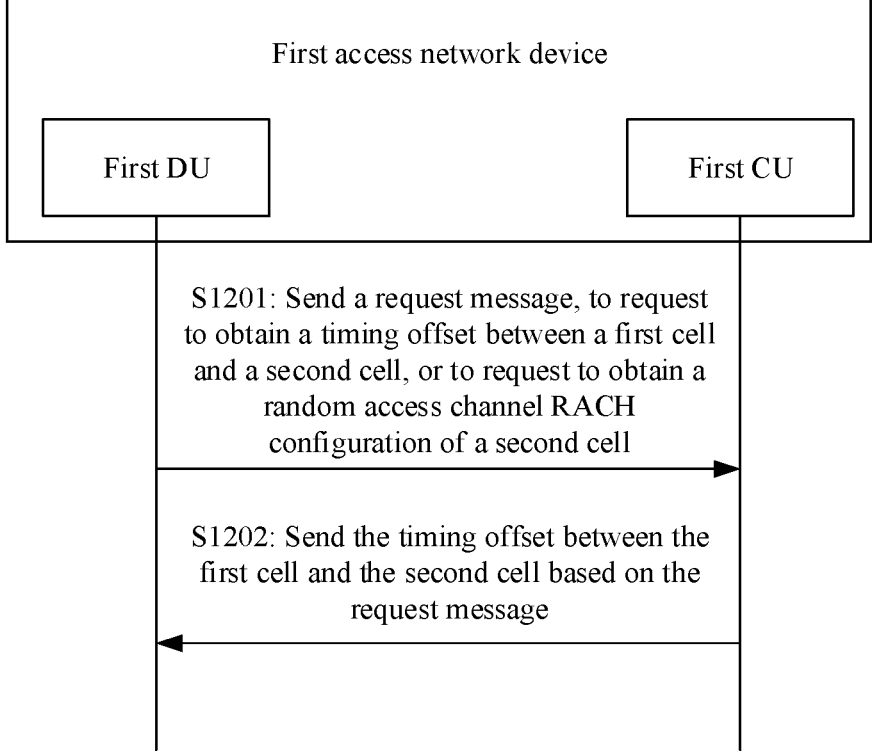
FIG. 16 is a flowchart of still another communication method according to an embodiment of this application.

FIG. 16 is a flowchart of still another communication method according to an embodiment of this application. As shown in FIG. 16, step S802 may include the following steps.

S1201: A first DU sends a request message to a first CU, to request to obtain a timing offset between a first cell and a second cell, or to request to obtain a random access channel RACH configuration of a second cell.

Accordingly, the first CU receives the request message.

It may be understood that, for example, the first DU may send the request message to the first CU when considering that there is a potential RACH configuration conflict in the first cell. For example, the first DU may send the request message to the first CU when considering, based on a quantity that is in a RACH report reported by a terminal device and that is of times of random access performed by each terminal device, that there is the potential RACH configuration conflict in the first cell. Optionally, the request message may be, for example, a potential RACH configuration conflict message, a RACH configuration request message, or a timing offset request message. In addition, a name of the request message is not limited in this embodiment of this application. For example, the request message may be a dedicated request message.

S1202: The first CU sends the timing offset between the first cell and the second cell to the first DU based on the request message.

In this implementation, the request message may carry an identifier of the first cell, to indicate, by using the identifier of the first cell, the first CU to send a timing offset between a specific cell and a neighboring cell. An identifier of a cell herein may include, for example, a cell ID and/or frequency information of the cell. In a RACH optimization scenario, when the request message carries the identifier of the first cell, in some embodiments, the first cell may further be considered as a cell in which a potential RACH configuration conflict may occur, a cell in which a RACH configuration conflict may occur, or the like.

Optionally, when the first CU sends the timing offset between the first cell and the second cell to the first DU based on the request message of the first DU, the RACH configuration of the second cell may be further included.

If there are a plurality of cells served by the first DU and the request message does not carry an identifier of any cell, the first CU may send, to the first DU, a timing offset that is obtained by the first CU and that is between at least one cell served by the first DU and a neighboring cell of the cell, namely, a timing offset between each of the plurality of cells served by the first DU and (at least one) neighboring cell of the cell. The RACH optimization scenario is used as an example. Optionally, when the first CU sends, to the first DU based on the request message of the first DU, the timing offset between the at least one cell served by the first DU and the neighboring cell of the cell, a RACH configuration of the neighboring cell of the cell may be further included.

Still refer to the example shown in the implementation 1. If the request message sent by the first DU to the first CU carries an identifier of the cell 1, the first CU may send the following timing offset information to the first DU: the timing offset between the cell 1 and the cell 4, the timing offset between the cell 1 and the cell 5, and the timing offset between the cell 1 and the cell 6. If the request message sent by the first DU to the first CU does not carry an identifier of any cell, the first CU may send the following timing offsets to the first DU: the timing offset between the cell 1 and the cell 4, the timing offset between the cell 1 and the cell 5, the timing offset between the cell 1 and the cell 6, the timing offset between the cell 2 and the cell 7, and the timing offset between the cell 2 and the cell 8.

It should be understood that when the messages described in the foregoing three implementations do not include any timing offset, the first DU may consider that there is no timing offset between the first cell and the second cell, in other words, the first cell and the second cell use same timing.

In addition, in a RACH configuration scenario, how the first CU sends the timing offset between the first cell and the second cell and the RACH configuration of the second cell to the first DU is merely described as an example in the foregoing three implementations. A person skilled in the art may understand that the timing offset between the first cell and the second cell and the RACH configuration of the second cell may alternatively be transferred to the first DU by using different messages in the foregoing three implementations. For example, the first CU sends the timing offset between the first cell and the second cell to the first DU by using the F1 setup response message, and sends the RACH configuration of the second cell to the first DU by using the CU configuration update message. The rest can be deduced by analogy, and examples are not enumerated one by one.

The RACH configuration of the second cell in the foregoing embodiment may be obtained, for example, in the following manners.

If the second cell is a cell served by another DU of the first CU, the first CU may obtain the RACH configuration of the second cell from the another DU, and then send the RACH configuration of the second cell to the first DU.

If the second cell is a cell served by the second access network device, the first CU may receive the RACH configuration of the second cell from the second access network device.

For example, when the first access network device sets up an Xn interface with the second access network device, the first CU of the first access network device may send an Xn setup request message to the second access network device. The Xn setup request message may carry RACH configurations of cells served by all DUs of the first access network device. Accordingly, the second access network device sends an Xn setup response message to the first access network device. The Xn setup response message may carry a RACH configuration of a cell served by the second access network device.

Alternatively, the second access network device sends an Xn setup request message to the first CU of the first access network device. The Xn setup request message may carry a RACH configuration of a cell served by the second access network device. Accordingly, the first CU of the first access network device sends an Xn setup response message to the second access network device. The Xn setup response message may carry RACH configurations of cells served by all DUs of the first access network device.

For another example, when a configuration of the second access network device changes, for example, at least one cell is added, or one or more RACH configurations of one or more cells change, the second access network device may transfer the RACH configurations of these cells to the first CU of the first access network device by using an NG-RAN node configuration update message.

It should be understood that when the second access network device is of a CU/DU architecture, the foregoing procedure is implemented through interaction between a CU of the second access network device and the first CU of the first access network device.

It should be noted that the foregoing obtained RACH configuration of the second cell is a RACH configuration that is based on timing of the second cell.

After the first DU obtains the timing offset between the first cell and the second cell and the RACH configuration of the second cell, the first DU may determine, based on the timing offset between the first cell and the second cell, the RACH configuration of the second cell, and a RACH configuration of the first cell, whether there is a conflict between the RACH configuration of the first cell and the RACH configuration of the second cell. In this case, the RACH configuration of the first cell is a RACH configuration that is based on timing of the first cell, and the RACH configuration of the second cell is the RACH configuration that is based on the timing of the second cell. Therefore, the first DU may convert the RACH configuration of one of the cells based on the timing offset between the first cell and the second cell, to obtain RACH configurations that are of the two cells and that are based on same timing.

Figure 17:
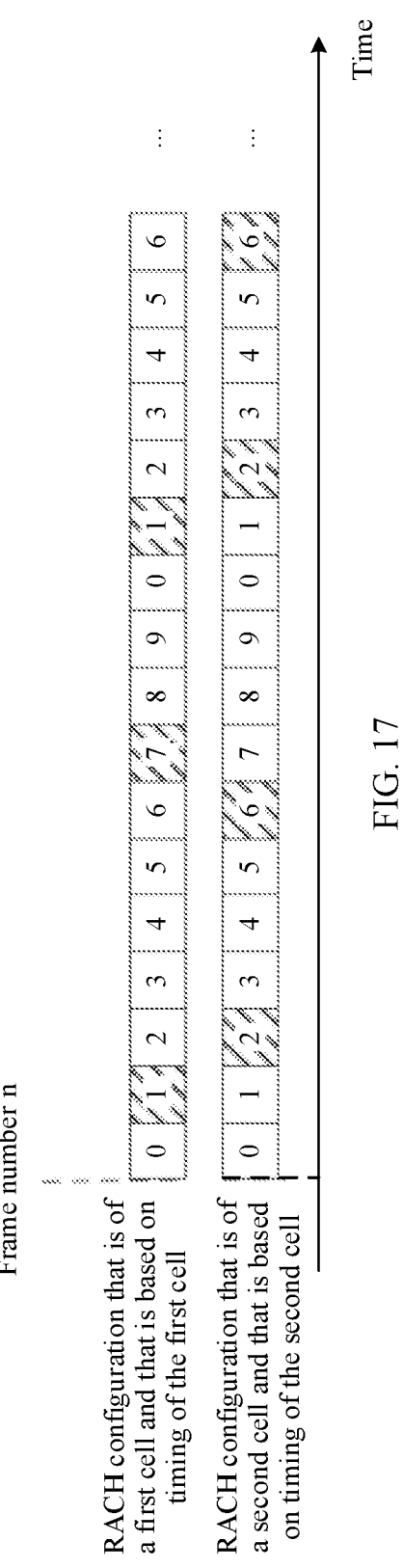
FIG. 17 is a schematic diagram 1 of still another RACH time domain resource.
Figure 18:
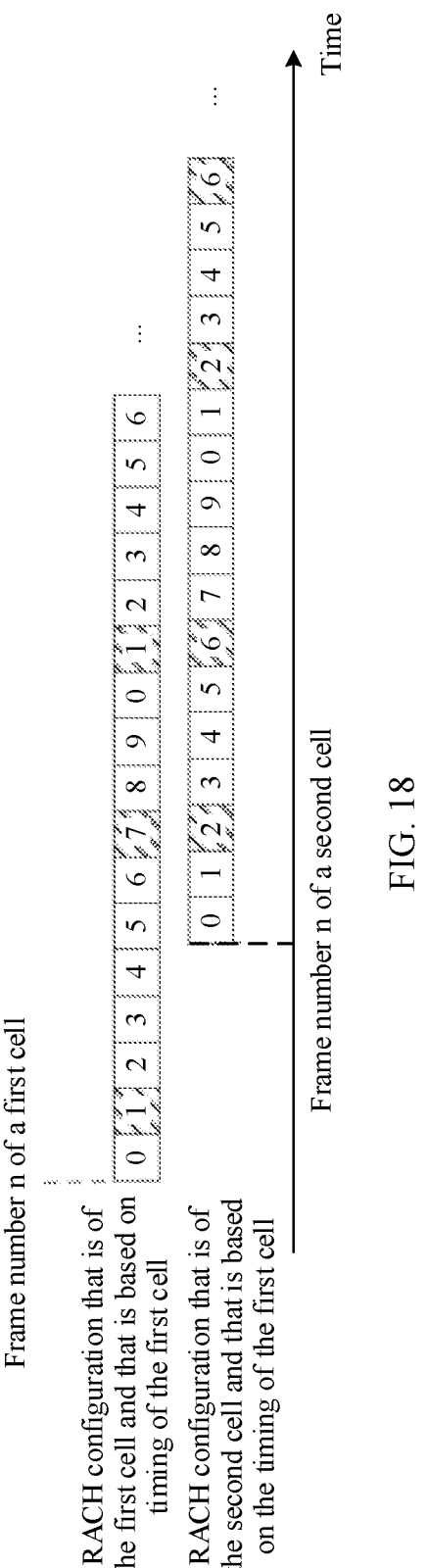
FIG. 18 is a schematic diagram 2 of still another RACH time domain resource.

FIG. 17 is a schematic diagram 1 of still another RACH time domain resource. FIG. 18 is a schematic diagram 2 of still another RACH time domain resource. It is assumed that a RACH configuration that is of a first cell and that is based on timing of the first cell and a RACH configuration that is of a second cell and that is based on timing of the second cell are shown in FIG. 17. A subframe filled with slashes is a subframe in which a RACH is allowed to be sent in the cell. In this example, a first DU may translate frames of the second cell based on a timing offset between the first cell and the second cell, to obtain, for example, a RACH configuration that is of the second cell, that is based on the timing of the first cell, and that is shown in FIG. 18. In this case, the RACH configuration of the first cell and the RACH configuration of the second cell are both based on the timing of the first cell. Alternatively, a first DU may translate frames of the first cell based on a timing offset between the first cell and the second cell, to obtain a RACH configuration (not shown in the figure) that is of the first cell and that is based on the timing of the second cell. In this case, the RACH configuration of the first cell and the RACH configuration of the second cell are both based on the timing of the second cell.

Still refer to FIG. 17 and FIG. 18. For example, the first cell allows a terminal device to send RACHs in the $1^{st}$ subframe and the $7^{th}$ subframe of each frame, the second cell allows the terminal device to send RACHs in the $2^{nd}$ subframe and the $6^{th}$ subframe of each frame. After the foregoing frame translation, it may be learned that a subframe in which a RACH is allowed to be sent in the first cell and a subframe in which a RACH is allowed to be sent in the second cell (partially or completely) overlap in terms of time. Therefore, the first DU determines that there is a conflict between the RACH configurations of the two cells. Optionally, in this scenario, the first DU may reset (reconfigure) a RACH configuration for the first cell, to avoid a conflict with the RACH configuration of the second cell, and ensure a success rate and an access latency of random access performed by the terminal device to the first cell and a success rate and an access latency of random access performed by the terminal device to the second cell. For example, the first DU may change some or all parameters in the RACH configuration of the first cell, to avoid the conflict with the RACH configuration of the second cell.

It should be understood that, after the foregoing frame translation, if the subframe in which the RACH is allowed to be sent in the first cell and the subframe in which the RACH is allowed to be sent in the second cell do not overlap in time, it may be determined that there is no conflict between the RACH configurations of the two cells. In this scenario, the first DU may not perform any processing.

Optionally, in some embodiments, if both the first cell and the second cell belong to a cell served by the first DU, when determining that there is a configuration conflict between the first cell and the second cell, the first DU may reset (reconfigure) a RACH configuration for the second cell, to avoid a conflict with the RACH configuration of the first cell.

If the second cell is a cell served by another DU of a first access network device, the first DU may send indication information to the DU via the first CU, to indicate that there is a configuration conflict between the first cell and the second cell, so that the DU resets (reconfigures) a RACH configuration for the second cell based on the indication information, to avoid a conflict with the RACH configuration of the first cell.

If the second cell is a cell served by a second access network device, the first DU may send indication information to the second access network device via the first CU, so that the second access network device resets (reconfigures) a RACH configuration for the second cell based on the indication information, to avoid a conflict with the RACH configuration of the first cell. An example in which the second access network device is of a CU/DU architecture is used. It is assumed that the second access network device includes a second CU and a second DU, and the second cell is a cell served by the second DU. In this example, the second CU may receive the indication information sent by the first CU, and forward the indication information to the second DU, so that the second DU resets (reconfigures) the RACH configuration for the second cell based on the indication information.

According to the method provided in this embodiment, when a cell served by a DU of an access network device and a neighboring cell use different timing, a CU of the access network device may send a timing offset between the cell served by the DU and the neighboring cell to the DU, so that the DU can accurately identify, based on the timing offset, whether a RACH configuration conflict occurs between the cell and the neighboring cell, to optimize a RACH configuration of the cell when the conflict occurs, and ensure a success rate and an access latency of random access performed by a terminal device.

It should be understood that the foregoing method is not only applicable to a scenario of RACH optimization of a cell, but also applicable to a scenario of performing RACH configuration on the cell, so that when the RACH configuration is initially performed on the cell, a problem of a conflict with a RACH configuration of a neighboring cell can be avoided.

It may be understood that, although RACH optimization is used as an example in all the foregoing embodiments for describing how a DU obtains a timing offset between a cell served by the DU and a neighboring cell of the cell, a person skilled in the art may understand that a manner in which the DU obtains the timing offset between the cell served by the DU and the neighboring cell of the cell includes but is not limited to the RACH configuration or RACH optimization scenario, and may also be applicable to any scenario in which the timing offset between the cell served by the DU and the neighboring cell of the cell needs to be used. That is, an operation performed after the DU obtains the timing offset between the cell served by the DU and the neighboring cell of the cell is not limited in this embodiment.

The foregoing embodiments describe a process in which the first CU sends the timing offset between the first cell and the second cell to the first DU, and the first DU determines, based on the timing offset, the RACH configuration (that is based on the timing of the first cell) of the first cell, and the RACH configuration (that is based on the timing of the second cell) of the second cell, whether there is the conflict between the RACH configurations of the two cells. That is, the first DU converts the RACH configuration of one of the cells based on the timing offset, to determine whether there is the conflict between the RACH configurations of the two cells at the same timing.

The following embodiments are described from a perspective that a first CU sends a first RACH configuration (namely, a RACH configuration that is based on timing of a first cell) of a second cell to a first DU. The first DU determines, based on a RACH configuration (namely, a RACH configuration that is based on the timing of the first cell) of the first cell and the first RACH configuration of the second cell, whether there is a conflict between the RACH configurations of the two cells. The first DU no longer needs to perform processing on a RACH configuration of the second cell. Details are as follows.

Figures 19, 20:
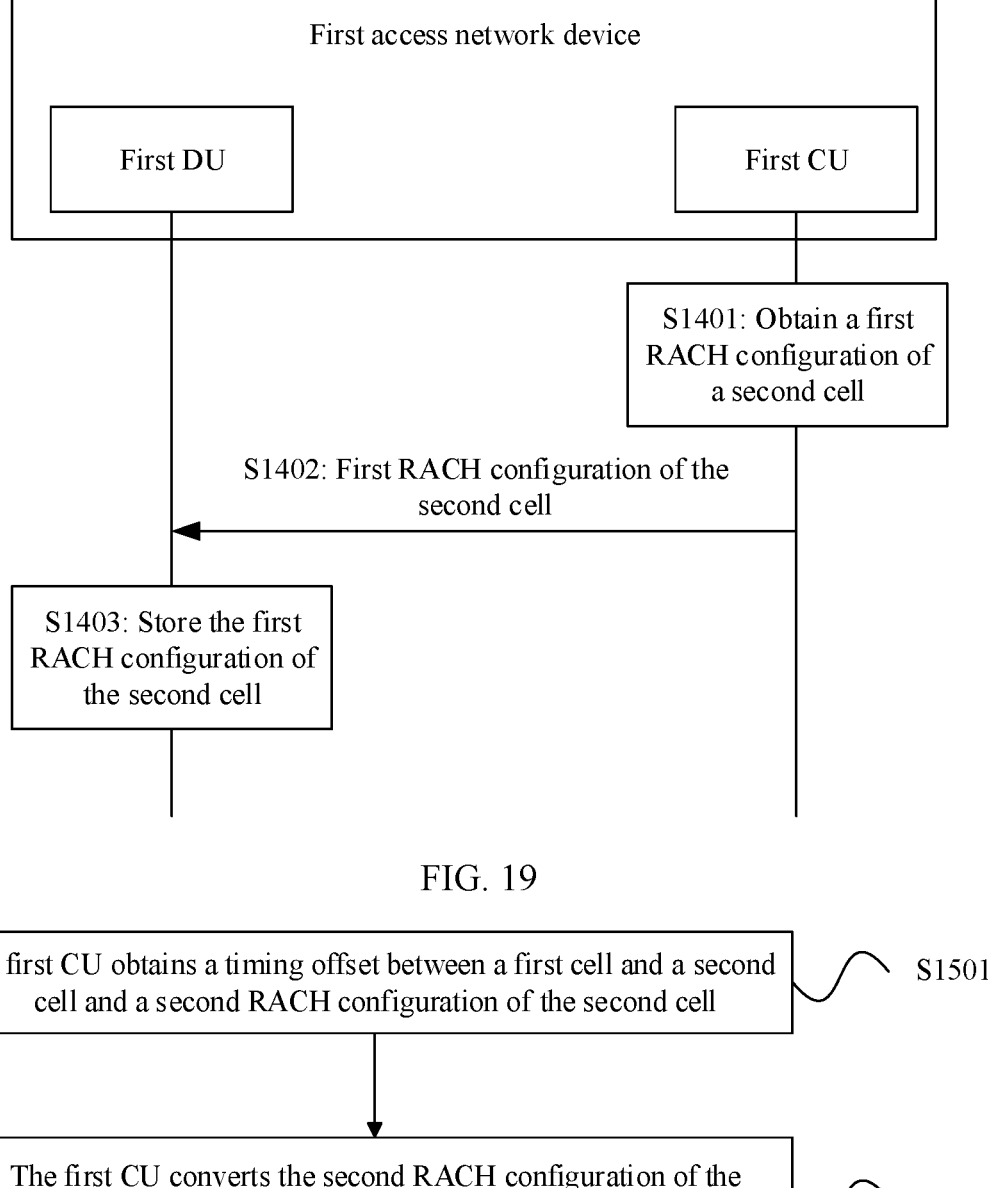
FIG. 19 is a schematic flowchart of still another communication method according to an embodiment of this application.
FIG. 20 is a schematic flowchart of still another communication method according to an embodiment of this application.

FIG. 19 is a schematic flowchart of still another communication method according to an embodiment of this application. As shown in FIG. 19, the method may include the following steps.

S1401: A first CU obtains a first RACH configuration of a second cell.

The first RACH configuration of the second cell is based on timing of a first cell.

S1402: The first CU sends the first RACH configuration of the second cell to a first DU.

Accordingly, the first DU receives the first RACH configuration of the second cell.

S1403: The first DU stores the first RACH configuration of the second cell. This step is optional. For example, the first DU may store the first RACH configuration of the second cell, and delete the first RACH configuration when maximum storage duration is reached. Alternatively, when receiving a first RACH configuration that is of the second cell and that is newly sent by the first CU, the first DU may delete a previously stored first RACH configuration of the second cell. Alternatively, the first DU may delete the first RACH configuration of the second cell after completing performing, based on the first RACH configuration of the second cell, a corresponding operation (for example, RACH configuration or RACH optimization).

For example, the first CU may obtain the first RACH configuration of the second cell in the following manners.

Manner A: After obtaining a second RACH configuration (a RACH configuration that is based on timing of the second cell) of the second cell, the first CU converts the second RACH configuration into the first RACH configuration of the second cell. In this implementation, the second cell may be a cell served by the first DU, or may be a cell served by another DU of a first access network device, or may be a second cell served by a second access network device.

FIG. 20 is a schematic flowchart of still another communication method according to an embodiment of this application. As shown in FIG. 20, S1401 may include the following steps.

S1501: A first CU obtains a timing offset between a first cell and a second cell and a second RACH configuration of the second cell.

For how the first CU obtains the timing offset between the first cell and the second cell and the second RACH configuration of the second cell, refer to the descriptions in the foregoing embodiments.

S1502: The first CU converts the second RACH configuration of the second cell into a first RACH configuration of the second cell based on the timing offset between the first cell and the second cell.

For how the first CU converts the second RACH configuration of the second cell into the first RACH configuration of the second cell, refer to the descriptions of the examples corresponding to FIG. 17 and FIG. 18.

For example, the first DU has two cells: a cell 3 and a cell 4. Neighboring cells of both the cell 3 and the cell 4 are a cell 1 and a cell 2.

In this case, the first CU may perform the following operations:

generating, based on a timing offset between the cell 3 and the cell 1, a RACH configuration that is of the cell 1 and that is based on timing of the cell 3;

generating, based on a timing offset between the cell 3 and the cell 2, a RACH configuration that is of the cell 2 and that is based on the timing of the cell 3;

generating, based on a timing offset between the cell 4 and the cell 1, a RACH configuration that is of the cell 1 and that is based on timing of the cell 4; and generating, based on a timing offset between the cell 4 and the cell 2, a RACH configuration that is of the cell 2 and that is based on the timing of the cell 4.

It should be noted that a neighboring relationship is at a cell level rather than a base station level. A second access network device is used as an example. It is assumed that the second access network device is adjacent to a first access network device, and both the cell 1 and the cell 2 belong to cells served by the second access network device. If the cell 1 is not a neighboring cell of the cell 3, and only the cell 2 is a neighboring cell of the cell 3, for the cell 3, the first CU does not need to generate the RACH configuration that is of the cell 1 and that is based on the timing of the cell 3, and also does not need to send, to the first DU, the RACH configuration that is of the cell 1 and that is based on the timing of the cell 3. That is, the first CU performs a RACH configuration conversion operation only on cells that have an actual adjacency relationship.

Optionally, in some embodiments, the first CU may have no available timing offsets between the first cell and some or all second cells adjacent to the first cell (that is, the first CU does not have the timing offsets between the first cell and these cells, or the first CU does not obtain the timing offsets between the first cell and these cells). In this scenario, the first CU may not perform the RACH configuration conversion operation on these cells. In some other embodiments, if the timing offset that is between the first cell and the second cell and that is obtained by the first CU is 0, it indicates that the first cell is synchronized with the second cell in terms of "time". For example, frame numbers of the first cell and the second cell are synchronized, and frame boundaries are aligned. In this scenario, the first CU does not need to perform the RACH configuration conversion operation on the second cell, and directly uses the second RACH configuration of the second cell as the first RACH configuration of the second cell.

Manner B: For the second cell served by a second access network device, the first CU may receive the first RACH configuration of the second cell from the second access network device.

In this embodiment, before sending a RACH configuration of the second cell to the first CU of a first access network device, the second access network device may convert a second RACH configuration (that is, a RACH configuration that is based on timing of the second cell) of the second cell into the first RACH configuration of the second cell based on a timing offset between a first cell and the second cell.

For how access network devices exchange RACH configurations of cells, refer to the descriptions in the foregoing embodiments. For how the second access network device obtains the timing offset between the first cell and the second cell and how the second access network device converts the second RACH configuration of the second cell into the first RACH configuration of the second cell based on the timing offset, refer to the descriptions of Manner A.

Optionally, in some embodiments, the second access network device may have no available timing offset between the first cell and the second cell (that is, the second access network device has no timing offset between the first cell and the second cell, or the second access network device does not obtain the timing offset between the first cell and the second cell). In this scenario, the second access network device may not perform the RACH configuration conversion operation, but send the second RACH configuration of the second cell to the first CU. In some other embodiments, if the timing offset that is between the first cell and the second cell and that is obtained by the second access network device is 0, it indicates that the first cell is synchronized with the second cell in terms of "time". For example, frame numbers of the first cell and the second cell are synchronized, and frame boundaries are aligned. In this scenario, the second access network device does not need to perform the RACH configuration conversion operation on the second cell, and directly uses the second RACH configuration of the second cell as the first RACH configuration of the second cell.

Optionally, in this implementation, when the second access network device sends the RACH configuration of the second cell to the first CU, first indication information may be further carried, where the first indication information is used by the first access network device to determine whether the RACH configuration of the second cell is a RACH configuration that is based on timing of the first cell. In this way, after receiving the RACH configuration that is of the second cell and that is sent by the second access network device, the first CU may learn, based on the first indication information, whether the RACH configuration of the second cell is the RACH configuration that is based on the timing of the first cell.

For example, the first indication information may be implemented by using a one-bit field. When a value of the field is 1, it indicates that the RACH configuration of the second cell is the RACH configuration that is based on the timing of the second cell; or when a value of the field is 0, it indicates that the RACH configuration of the second cell is the RACH configuration that is based on the timing of the first cell. Alternatively, when a value of the field is 0, it indicates that the RACH configuration of the second cell is the RACH configuration that is based on the timing of the second cell; or when a value of the field is 1, it indicates that the RACH configuration of the second cell is the RACH configuration that is based on the timing of the first cell.

For another example, whether the first indication information is carried when the RACH configuration of the second cell is sent is used for implementation. For example, when the first indication information is carried, it indicates that the RACH configuration of the second cell is the RACH configuration that is based on the timing of the second cell; or when the first indication information is not carried, it indicates that the RACH configuration of the second cell is the RACH configuration that is based on the timing of the first cell. Alternatively, when the first indication information is carried, it indicates that the RACH configuration of the second cell is the RACH configuration that is based on timing of the first cell; or when the first indication information is not carried, it indicates that the RACH configuration of the second cell is the RACH configuration that is based on the timing of the second cell.

Certainly, the first indication information may alternatively indicate, in another manner, whether the RACH configuration of the second cell is the RACH configuration that is based on the timing of the first cell.

It should be understood that when the second access network device is of a CU/DU architecture, the foregoing procedure is implemented through interaction between a CU of the second access network device and the first CU of the first access network device.

It should be noted that the implementation provided in Manner B includes but is not limited to a scenario in which the first access network device is of the CU/DU architecture, and is also applicable to a scenario in which the first access network device is of a non-CU/DU architecture.

After obtaining the first RACH configuration of the second cell, for example, the first CU may send the first RACH configuration of the second cell to the first DU in the following manners.

Implementation 1: The first CU may send the first RACH configuration of the second cell to the first DU when setting up an F1 interface with the first DU.

Figure 21:
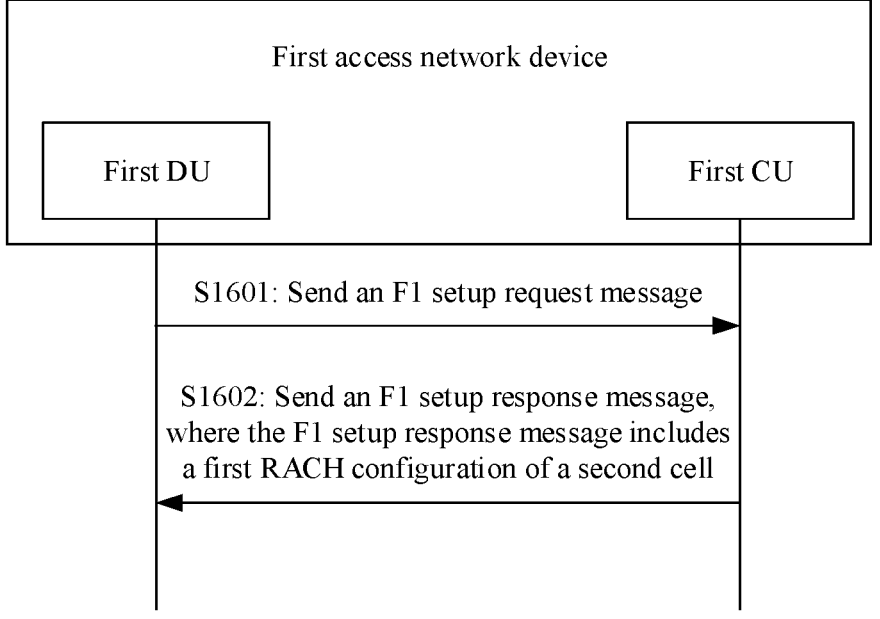
FIG. 21 is a schematic flowchart of still another communication method according to an embodiment of this application.

FIG. 21 is a schematic flowchart of still another communication method according to an embodiment of this application. As shown in FIG. 21, step S1402 may include the following steps.

S1601: A first DU sends an F1 setup request message to a first CU.

Accordingly, the first CU receives the F1 setup request message.

S1602: The first CU sends an F1 setup response message to the first DU, where the F1 setup response message includes a first RACH configuration of a second cell.

Accordingly, the first DU receives the F1 setup response message.

Optionally, the F1 setup response message may further include a RACH configuration that is obtained by the first CU, that is of a neighboring cell of some or all cells served by the first DU, and that is based on timing of the cell, namely, a RACH configuration that is obtained by the first CU, that is of at least one neighboring cell of each of a plurality of cells served by the first DU, and that is based on timing of the cell.

Implementation 2: The first CU may send the first RACH configuration of the second cell to the first DU when performing CU configuration update with the first DU.

Figure 22:
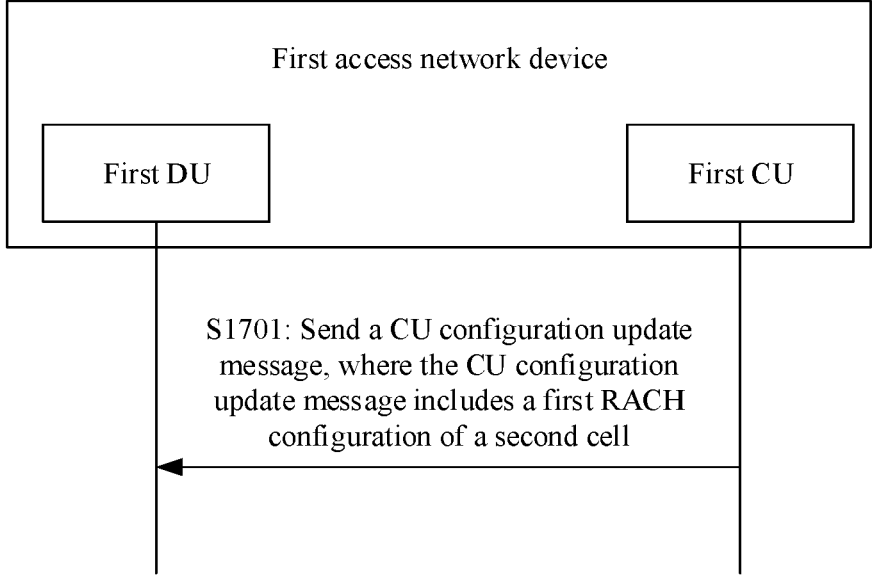
FIG. 22 is a schematic flowchart of still another communication method according to an embodiment of this application.

FIG. 22 is a schematic flowchart of still another communication method according to an embodiment of this application. As shown in FIG. 22, step S1402 may include the following step:

S1701: A first CU sends a CU configuration update message to a first DU, where the CU configuration update message includes a first RACH configuration of a second cell.

Accordingly, the first DU receives the CU configuration update message.

Implementation 3: The first DU actively requests to obtain the first RACH configuration of the second cell.

Figure 23:
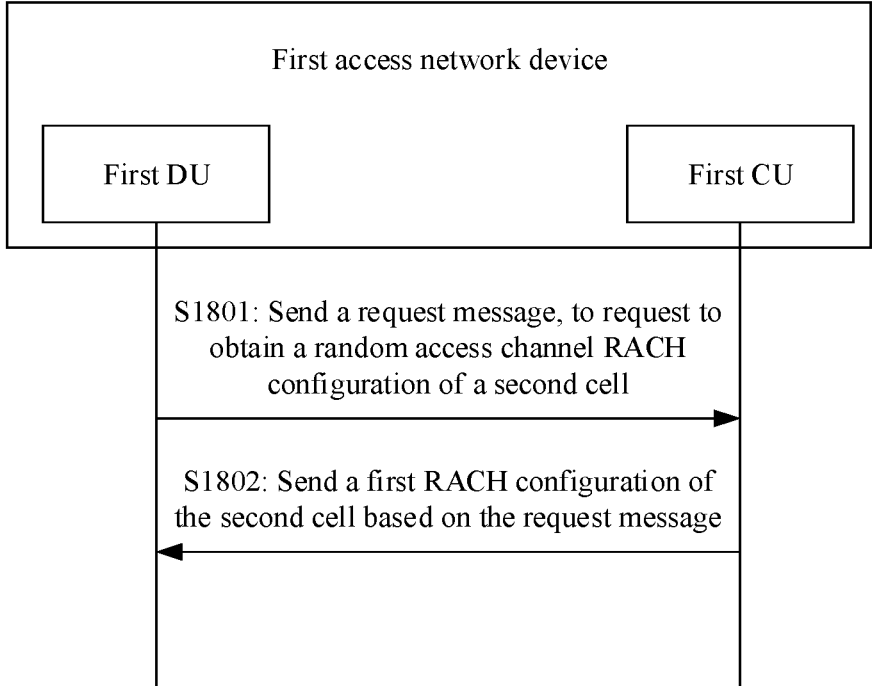
FIG. 23 is a flowchart of still another communication method according to an embodiment of this application.

FIG. 23 is a flowchart of still another communication method according to an embodiment of this application. As shown in FIG. 23, step S1402 may include the following steps:

S1801: A first DU sends a request message to a first CU, to request to obtain a random access channel RACH configuration of a second cell.

Accordingly, the first CU receives the request message.

It may be understood that, for example, the first DU may send the request message to the first CU when considering that there is a potential RACH configuration conflict in a first cell. For example, the first DU may send the request message to the first CU when considering, based on a quantity that is in a RACH report reported by a terminal device and that is of times of random access performed by each terminal device, that there is the potential RACH configuration conflict in the first cell. Optionally, the request message may be, for example, a potential RACH configuration conflict message or a RACH configuration request message. In addition, a name of the request message is not limited in this embodiment of this application. For example, the request message may be a dedicated request message.

S1802: The first CU sends a first RACH configuration of the second cell to the first DU based on the request message.

In this implementation, the request message may carry an identifier of the first cell, to indicate, by using the identifier of the first cell, the first CU to send a RACH configuration that is of a neighboring cell of a specific cell and that is based on timing of the specific cell. An identifier of a cell herein may be, for example, a cell ID and/or frequency information of the cell. In a RACH optimization scenario, when the request message carries the identifier of the first cell, in some embodiments, the first cell may further be considered as a cell in which a potential RACH configuration conflict may occur, a cell in which a RACH configuration conflict may occur, or the like.

If there are a plurality of cells served by the first DU and the request message does not carry an identifier of any cell, the first CU may send, to the first DU, a RACH configuration that is obtained by the first CU, that is of a neighboring cell of a cell served by the first DU, and that is based on timing of the cell, namely, a RACH configuration that is obtained by the first CU, that is of at least one neighboring cell of each of the plurality of cells served by the first DU, and that is based on the timing of the cell.

It should be noted that, in some embodiments, some RACH configurations that are of the second cell and that are obtained by the first CU are not RACH configurations that are based on timing of the first cell (for details, refer to the descriptions of the RACH configuration that is of the second cell and that is obtained when there is no timing offset between the first cell and the second cell in Manner A and Manner B). In this case, the first CU may not send, to the first DU, the RACH configurations that are of the second cell and that are not based on the timing of the first cell, that is, send only a RACH configuration that is of the second cell and that is based on the timing of the first cell. Alternatively, when the first CU sends a RACH configuration of the second cell to the first DU, second indication information may be further carried, where the second indication information is used by the first DU to determine whether the RACH configuration of the second cell is a RACH configuration that is based on the timing of the first cell. In this way, after receiving the RACH configuration of the second cell sent by the first CU, the first DU may learn, based on the second indication information, whether the RACH configuration of the second cell is the RACH configuration that is based on the timing of the first cell. Optionally, the second indication information may be obtained based on first indication information. For example, the first indication information is transparently transmitted to the first DU as the second indication information, or the first indication information may be processed and then sent to the first DU as the second indication information. Alternatively, the second indication information may be indication information generated by the first CU based on whether the RACH configuration of the second cell is the RACH configuration that is based on the timing of the first cell.

For example, the second indication information may be implemented by using a one-bit field. When a value of the field is 1, it indicates that the RACH configuration of the second cell is a RACH configuration that is based on timing of the second cell; or when a value of the field is 0, it indicates that the RACH configuration of the second cell is the RACH configuration that is based on the timing of the first cell. Alternatively, when a value of the field is 0, it indicates that the RACH configuration of the second cell is a RACH configuration that is based on timing of the second cell; or when a value of the field is 1, it indicates that the RACH configuration of the second cell is the RACH configuration that is based on the timing of the first cell.

For another example, whether the second indication information is carried when the RACH configuration of the second cell is sent is used for implementation. For example, when the second indication information is carried, it indicates that the RACH configuration of the second cell is a RACH configuration that is based on timing of the second cell; or when the second indication information is not carried, it indicates that the RACH configuration of the second cell is the RACH configuration that is based on the timing of the first cell. Alternatively, when the second indication information is carried, it indicates that the RACH configuration of the second cell is the RACH configuration that is based on the timing of the first cell; or when the second indication information is not carried, it indicates that the RACH configuration of the second cell is a RACH configuration that is based on timing of the second cell.

Certainly, the second indication information may alternatively indicate, in another manner, whether the RACH configuration of the second cell is the RACH configuration that is based on the timing of the first cell.

Corresponding to the scenarios in FIG. 21 to FIG. 23, for example, a message sent by the first CU to the first DU may carry the second indication information, to indicate whether the RACH configuration of the second cell carried in the message is the RACH configuration that is based on the timing of the first cell.

In this embodiment, after the first DU obtains the first RACH configuration of the second cell, the first DU may determine, based on the first RACH configuration (namely, the RACH configuration that is based on the timing of the first cell) of the second cell and a RACH configuration (namely, a RACH configuration that is based on the timing of the first cell) of the first cell, whether there is a conflict between the RACH configuration of the first cell and the first RACH configuration of the second cell. In this case, the RACH configurations of the two cells are RACH configurations that are based on the same timing. Therefore, the first DU can accurately identify whether there is the conflict between the RACH configurations of the two cells.

If there is the conflict (for example, a subframe in which a RACH is allowed to be sent in the first cell and a subframe in which a RACH is allowed to be sent in the second cell partially or completely overlap in terms of time), the first DU may reset (reconfigure) a RACH configuration for the first cell, to avoid the conflict with the RACH configuration of the second cell, and ensure a success rate and an access latency of random access performed by the terminal device to the first cell and a success rate and an access latency of random access performed by the terminal device to the second cell. If there is no conflict (for example, a subframe in which a RACH is allowed to be sent in the first cell and a subframe in which a RACH is allowed to be sent in the second cell do not overlap in terms of time), the first DU may not perform any processing.

Optionally, in some embodiments, if both the first cell and the second cell belong to a cell served by the first DU, when determining that there is a configuration conflict between the first cell and the second cell, the first DU may reset (reconfigure) a RACH configuration for the second cell, to avoid a conflict with the RACH configuration of the first cell.

If the second cell is a cell served by another DU of a first access network device, the first DU may send indication information to the DU via the first CU, to indicate that there is a configuration conflict between the first cell and the second cell, so that the DU resets (reconfigures) a RACH configuration for the second cell based on the indication information, to avoid a conflict with the RACH configuration of the first cell.

If the second cell is a cell served by a second access network device, the first DU may send indication information to the second access network device via the first CU, so that the second access network device resets (reconfigures) a RACH configuration for the second cell based on the indication information, to avoid a conflict with the RACH configuration of the first cell. An example in which the second access network device is of a CU/DU architecture is used. It is assumed that the second access network device includes a second CU and a second DU, and the second cell is a cell served by the second DU. In this example, the second CU may receive the indication information sent by the first CU, and forward the indication information to the second DU, so that the second DU resets (reconfigures) the RACH configuration for the second cell based on the indication information.

According to the method provided in this embodiment, when a cell served by a DU of an access network device and a neighboring cell use different timing, a CU of the access network device may send, to the DU, a RACH configuration that is of the neighboring cell of the cell served by the DU and that is based on timing of the cell, so that the DU can accurately identify, based on RACH configurations that are of the two cells and that are based on same timing, whether a RACH configuration conflict occurs between the cell and the neighboring cell, to optimize the RACH configuration of the cell when the conflict occurs, and ensure a success rate and an access latency of random access performed by a terminal device.

It should be understood that the foregoing method is not only applicable to a scenario of RACH optimization of a cell, but also applicable to a scenario of performing RACH configuration on the cell, so that when the RACH configuration is initially performed on the cell, a problem of a conflict with a RACH configuration of a neighboring cell can be avoided.

It may be understood that in the foregoing method embodiments, the operations or steps implemented by the CU may be implemented by a component (for example, a chip or a circuit) that may be configured in the CU, the operations or steps implemented by the DU may be implemented by a component (for example, a chip or a circuit) that may be configured in the DU, and the operations or steps implemented by the access network device may be implemented by a component (for example, a chip or a circuit) that may be configured in the access network device.

Figure 24:
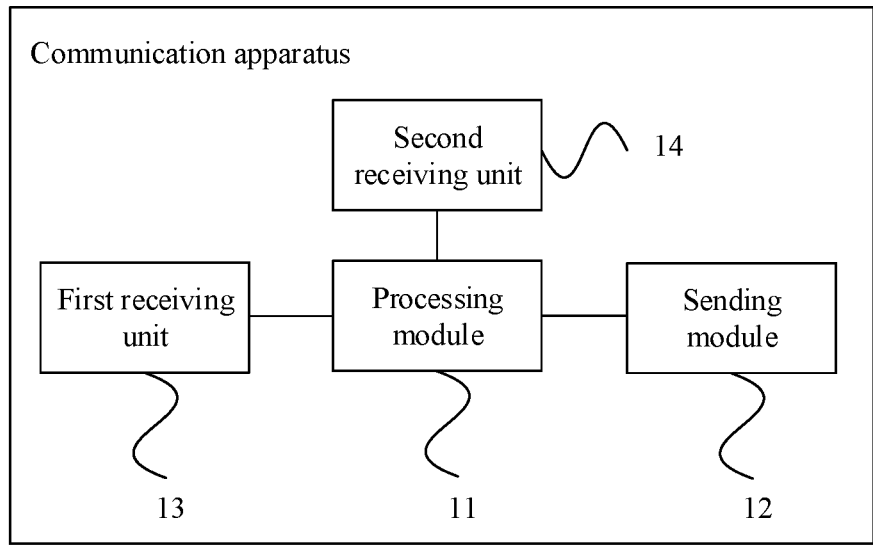
FIG. 24 is a schematic diagram of a structure of a communication apparatus according to an embodiment of this application.

FIG. 24 is a schematic diagram of a structure of a communication apparatus according to an embodiment of this application. It may be understood that the communication apparatus may correspondingly implement the operations or steps corresponding to the first CU in the foregoing method embodiments. The communication apparatus may be a CU or a component that may be configured in the CU. As shown in FIG. 24, the communication apparatus may include a processing module 11 and a sending module 12. Optionally, in some embodiments, the communication apparatus may further include a first receiving module 13 and/or a second receiving module 14.

In a possible implementation, the processing module 11 is configured to obtain a timing offset between a first cell and a second cell. The first cell is a cell served by a DU, the second cell is a neighboring cell of the first cell, and both a CU and the DU belong to a first access network device. The timing offset between the first cell and the second cell means an offset between timing of the two cells. For example, the timing offset may include: a frame number offset and a frame boundary offset between the first cell and the second cell, a frame number offset, a subframe number offset, and a subframe boundary offset between the first cell and the second cell, a time offset, relative to a frame boundary of a same frame, between the first cell and the second cell, or the like. For example, the processing module 11 is specifically configured to obtain the timing offset between the first cell and the second cell by using the timing offset that is between the first cell and the second cell and that is received by the second receiving module 14 from a terminal device. In this case, the processing module 11 and the second receiving module 14 may alternatively be integrated into the processing module 11 or the second receiving module 14. Alternatively, when the second cell is a cell served by a second access network device, the processing module 11 is specifically configured to obtain the timing offset between the first cell and the second cell by using the timing offset that is between the first cell and the second cell and that is received by the second receiving module 14 from the second access network device. In this case, the processing module 11 and the second receiving module 14 may alternatively be integrated into the processing module 11 or the second receiving module 14.

The sending module 12 is configured to send the timing offset between the first cell and the second cell to the DU.

For example, the first receiving module 13 is configured to receive a request message from the DU. The request message is for requesting to obtain the timing offset between the first cell and the second cell, or requesting to obtain a random access channel RACH configuration of the second cell. Correspondingly, the sending module 12 is specifically configured to send the timing offset between the first cell and the second cell to the DU based on the request message. Optionally, the request message carries an identifier of the first cell.

Alternatively, the first receiving module 13 is configured to receive an F1 setup request message from the DU. Correspondingly, the sending module 12 is specifically configured to send an F1 setup response message to the DU, where the F1 setup response message includes the timing offset between the first cell and the second cell. Alternatively, the sending module 12 is specifically configured to send a CU configuration update message to the DU, where the CU configuration update message includes the timing offset between the first cell and the second cell.

The communication apparatus provided in this embodiment can perform the actions of the first CU in the method embodiment corresponding to FIG. 12. Implementation principles and technical effects thereof are similar, and details are not described herein again. Optionally, the first CU may further include at least one storage module. The storage module may include data and/or instructions. The processing module and/or a transceiver module (or the first receiving module, the second receiving module, and the sending module) may read the data and/or the instructions in the storage module, to implement a corresponding method.

In another possible implementation, the processing module 11 is configured to obtain a first RACH configuration of a second cell. The first RACH configuration of the second cell is based on timing of a first cell. The first cell is a cell served by a distributed unit DU, the second cell is a neighboring cell of the first cell, and both a CU and the DU belong to a first access network device.

For example, the processing module 11 may be configured to obtain a timing offset between the first cell and the second cell and a second RACH configuration of the second cell, and convert the second RACH configuration of the second cell into the first RACH configuration of the second cell based on the timing offset between the first cell and the second cell. The second RACH configuration of the second cell is based on timing of the second cell.

The timing offset between the first cell and the second cell means an offset between timing of the two cells. For example, the timing offset may include: a frame number offset and a frame boundary offset between the first cell and the second cell, a frame number offset, a subframe number offset, and a subframe boundary offset between the first cell and the second cell, a time offset, relative to a frame boundary of a same frame, between the first cell and the second cell, or the like. For example, the processing module 11 may obtain the timing offset between the first cell and the second cell by using the timing offset that is between the first cell and the second cell and that is received by the first receiving module 13 from a terminal device. In this case, the processing module 11 and the first receiving module 13 may alternatively be integrated into the processing module 11 or the first receiving module 13. Alternatively, when the second cell is a cell served by a second access network device, the processing module 11 may obtain the timing offset between the first cell and the second cell by using the timing offset that is between the first cell and the second cell and that is received by the first receiving module 13 from the second access network device. In this case, the processing module 11 and the first receiving module 13 may alternatively be integrated into the processing module 11 or the first receiving module 13.

For another example, when the second cell is a cell served by a second access network device, the processing module 11 may receive the first RACH configuration of the second cell from the second access network device via the first receiving module 13. In a possible implementation, the processing module 11 may receive, via the first receiving module 13, a RACH configuration of the second cell and first indication information from the second access network device, where the first indication information indicates that the RACH configuration of the second cell is a RACH configuration that is based on the timing of the first cell.

The sending module 12 is configured to send the first RACH configuration of the second cell to the DU.

For example, the second receiving module 14 is configured to receive a request message from the DU, where the request message is for requesting to obtain the RACH configuration of the second cell. Correspondingly, the sending module 12 is specifically configured to send the first RACH configuration of the second cell to the DU based on the request message. Optionally, the request message carries an identifier of the first cell.

Alternatively, the second receiving module 14 is configured to receive an F1 setup request message from the DU. Correspondingly, the sending module 12 is specifically configured to send an F1 setup response message to the DU, where the F1 setup response message includes the first RACH configuration of the second cell.

Alternatively, the sending module 12 is specifically configured to send a CU configuration update message to the DU, where the CU configuration update message includes the first RACH configuration of the second cell.

Optionally, the sending module 12 is specifically configured to send the RACH configuration of the second cell and second indication information to the DU. The second indication information indicates that the RACH configuration of the second cell is the RACH configuration that is based on the timing of the first cell.

The first receiving module, the second receiving module, and the sending module may be integrated in a transceiver module, or may be separated.

The communication apparatus provided in this embodiment can perform the actions of the first CU in the method embodiment corresponding to FIG. 19. Implementation principles and technical effects thereof are similar, and details are not described herein again. Optionally, the first CU may further include at least one storage module. The storage module may include data and/or instructions. The processing module and/or the transceiver module (or the first receiving module, the second receiving module, and the sending module) may read the data and/or the instructions in the storage module, to implement a corresponding method.

Figure 25:
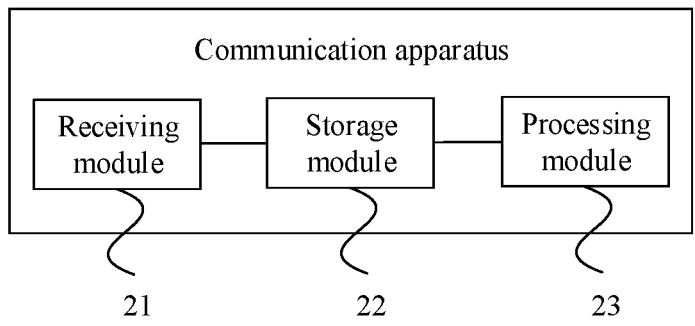
FIG. 25 is a schematic diagram of a structure of another communication apparatus according to an embodiment of this application.

FIG. 25 is a schematic diagram of a structure of another communication apparatus according to an embodiment of this application. It may be understood that the communication apparatus may correspondingly implement the operations or steps corresponding to the first DU in the foregoing method embodiments. The communication apparatus may be a DU or a component that may be configured in the DU. As shown in FIG. 25, the communication apparatus may include a receiving module 21 and a storage module 22.

Optionally, in some embodiments, the communication apparatus may further include a processing module 23.

In a possible implementation, the receiving module 21 is configured to receive a timing offset between a first cell and a second cell from a centralized unit CU. The first cell is a cell served by a DU, the second cell is a neighboring cell of the first cell, and both the CU and the DU belong to a first access network device. The storage module 22 is configured to store the timing offset between the first cell and the second cell.

In this implementation, in some embodiments, the receiving module 21 is further configured to receive a random access channel RACH configuration of the second cell from the CU. Correspondingly, the processing module 23 is configured to determine, based on the timing offset between the first cell and the second cell, the RACH configuration of the second cell, and a RACH configuration of the first cell, whether there is a conflict between the RACH configuration of the first cell and the RACH configuration of the second cell. In this implementation, the processing module 23 may be further configured to: when there is the conflict between the RACH configuration of the first cell and the RACH configuration of the second cell, reconfigure a RACH configuration for the first cell.

The communication apparatus provided in this embodiment can perform the actions of the first DU in the method embodiment corresponding to FIG. 12. Implementation principles and technical effects thereof are similar, and details are not described herein again. Optionally, the first DU may further include at least one storage module. The storage module may include data and/or instructions. The processing module and/or a transceiver module (or the receiving module) may read the data and/or the instructions in the storage module, to implement a corresponding method.

In another possible implementation, the receiving module 21 is configured to receive a first RACH configuration of a second cell from a centralized unit CU. The first RACH configuration of the second cell is based on timing of a first cell, the first cell is a cell served by a DU, the second cell is a neighboring cell of the first cell, and both the CU and the DU belong to a first access network device. The storage module 22 is configured to store the first RACH configuration of the second cell.

In this implementation, in some embodiments, the processing module 23 is configured to determine, based on the first RACH configuration of the second cell and a RACH configuration of the first cell, whether there is a conflict between the RACH configuration of the first cell and the first RACH configuration of the second cell. In this implementation, the processing module 23 is further configured to: when there is the conflict between the RACH configuration of the first cell and the first RACH configuration of the second cell, reconfigure a RACH configuration for the first cell.

The communication apparatus provided in this embodiment can perform the actions of the first DU in the method embodiment corresponding to FIG. 19. Implementation principles and technical effects thereof are similar, and details are not described herein again. Optionally, the first DU may further include at least one storage module. The storage module may include data and/or instructions. The processing module and/or a transceiver module (or the receiving module) may read the data and/or the instructions in the storage module, to implement a corresponding method.

Figure 26:
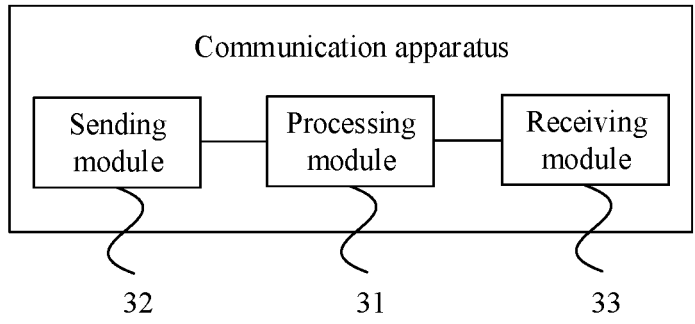
FIG. 26 is a schematic diagram of a structure of still another communication apparatus according to an embodiment of this application.

FIG. 26 is a schematic diagram of a structure of still another communication apparatus according to an embodiment of this application. It may be understood that the communication apparatus may correspondingly implement the operations or steps corresponding to the second access network device in the foregoing method embodiments. The communication apparatus may be a second access network device, or may be a component that can be configured in the second access network device. Alternatively, the communication apparatus may be a CU of a second access network device, or may be a component that can be configured in the CU of the second access network device. As shown in FIG. 26, the communication apparatus may include a processing module 31 and a sending module 32. Optionally, in some embodiments, the communication apparatus may further include a receiving module 33.

The processing module 31 is configured to obtain a first RACH configuration of a second cell. The first RACH configuration of the second cell is based on timing of a first cell, the second cell is a cell served by the second access network device, the first cell is a cell served by a distributed unit DU, the second cell is a neighboring cell of the first cell, and both a CU and the DU belong to a first access network device.

For example, the processing module 31 may be configured to obtain a timing offset between the first cell and the second cell and a second RACH configuration of the second cell, and convert the second RACH configuration of the second cell into the first RACH configuration of the second cell based on the timing offset between the first cell and the second cell. The second RACH configuration of the second cell is based on timing of the second cell.

The timing offset between the first cell and the second cell means an offset between timing of the two cells. For example, the timing offset may include: a frame number offset and a frame boundary offset between the first cell and the second cell, a frame number offset, a subframe number offset, and a subframe boundary offset between the first cell and the second cell, a time offset, relative to a frame boundary of a same frame, between the first cell and the second cell, or the like. For example, the processing module 31 may obtain the timing offset between the first cell and the second cell by using the timing offset that is between the first cell and the second cell and that is received by the receiving module 33 from a terminal device. In this case, the processing module 31 and the receiving module 33 may alternatively be integrated into the processing module 31 or the receiving module 33. Alternatively, the processing module 31 may obtain the timing offset between the first cell and the second cell by using the timing offset that is between the first cell and the second cell and that is received by the receiving module 33 from the CU. In this case, the processing module 31 and the receiving module 33 may alternatively be integrated into the processing module 31 or the receiving module 33.

The sending module 32 is configured to send the first RACH configuration of the second cell to the CU. For example, the sending module 32 is specifically configured to send a RACH configuration of the second cell and first indication information to the CU, where the first indication information indicates that the RACH configuration of the second cell is a RACH configuration that is based on the timing of the first cell.

The communication apparatus provided in this embodiment can perform the actions of the second access network device in the method embodiment corresponding to FIG. 19. Implementation principles and technical effects thereof are similar, and details are not described herein again. Optionally, the second access network device may further include at least one storage module. The storage module may include data and/or instructions. The processing module and/or a transceiver module (or the receiving module and the sending module) may read the data and/or the instructions in the storage module, to implement a corresponding method.

It should be noted that, it should be understood that in the foregoing embodiments, the sending module may be a transmitter during actual implementation, and the receiving module may be a receiver during actual implementation. Alternatively, the sending module and the receiving module are implemented by using a transceiver. Alternatively, the sending module and the receiving module are implemented by using a communication port. The processing module may be implemented in a form of software invoked by a processing element, or in a form of hardware. For example, the processing module may be at least one separately disposed processing element, or may be integrated into a chip of the foregoing CU or DU for implementation. In addition, the processing module may be stored in a memory of the foregoing CU or DU in a form of program code, and may be invoked by a processing element of the foregoing CU or DU to perform a function of the foregoing processing module. In addition, all or some of the modules may be integrated together, or may be implemented independently. The processing element herein may be an integrated circuit and has a signal processing capability. In an implementation process, steps in the foregoing methods or the foregoing modules may be implemented by using a hardware integrated logical circuit in the processing element, or by using instructions in a form of software.

To be specific, the foregoing modules may be configured as one or more integrated circuits for performing the foregoing methods, for example, one or more application-specific integrated circuits (ASICs), one or more microprocessors (digital signal processors, DSPs), or one or more field programmable gate arrays (FPGAs). For another example, when one of the foregoing modules is implemented by scheduling program code by a processing element, the processing element may be a general-purpose processor, for example, a central processing unit (CPU) or another processor that may invoke the program code. For another example, these modules may be integrated together, and implemented in a form of a system-on-a-chip (SOC).

Figure 27:
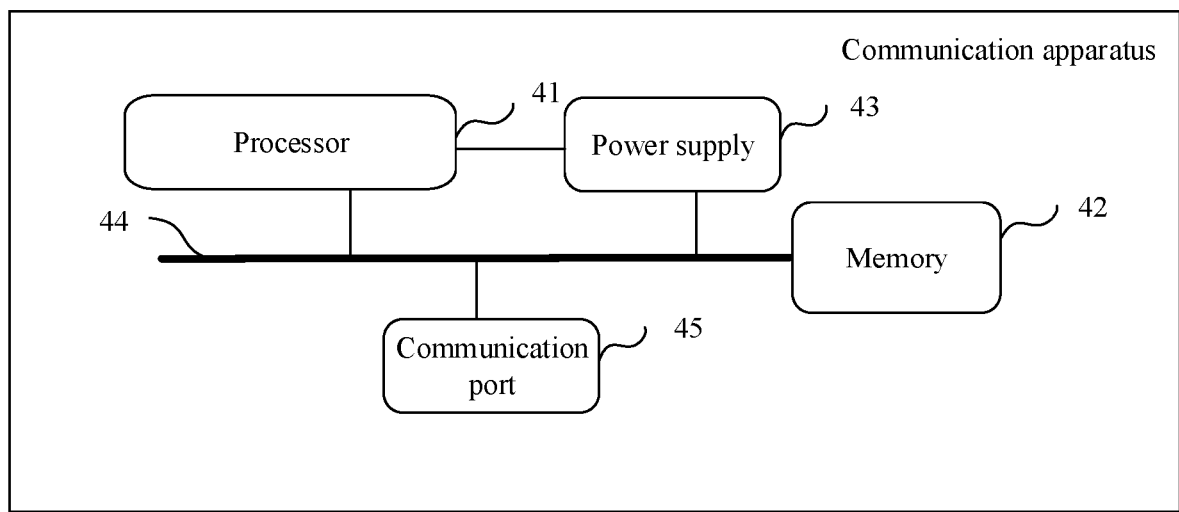
FIG. 27 is a schematic diagram of a structure of still another communication apparatus according to an embodiment of this application.

FIG. 27 is a schematic diagram of a structure of still another communication apparatus according to an embodiment of this application. As shown in FIG. 27, the communication apparatus may include at least one processor 41 (for example, a CPU) and at least one memory 42. FIG. 27 is the schematic diagram in which one processor 41 and one memory 42 are used as an example. The memory 42 may include a high-speed random access memory (RAM), and may further include a non-volatile memory (NVM), for example, at least one disk memory. The memory 42 may store various instructions and/or data, to complete various processing functions and implement the method steps of this application. Optionally, the communication apparatus in this application may further include a power supply 43, a communication bus 44, and a communication port 45. The communication bus 44 is configured to implement communication and connection between components. The communication port 45 is configured to implement connection and communication between the communication apparatus and another peripheral.

In some possible implementations, the memory 42 is configured to store computer-executable program code, and the program code includes instructions. When the processor 41 executes the instructions, the instructions enable the processor 41 of the communication apparatus to perform the actions of the first CU in the foregoing method embodiments. Implementation principles and technical effects thereof are similar, and details are not described herein again.

Alternatively, in some possible implementations, the memory 42 is configured to store computer-executable program code, and the program code includes instructions. When the processor 41 executes the instructions, the instructions enable the processor 41 of the communication apparatus to perform the actions of the first DU in the foregoing method embodiments. Implementation principles and technical effects thereof are similar, and details are not described herein again.

Alternatively, in some possible implementations, the memory 42 is configured to store computer-executable program code, and the program code includes instructions. When the processor 41 executes the instructions, the instructions enable the processor 41 of the communication apparatus to perform the actions of the second access network device in the foregoing method embodiments. Implementation principles and technical effects thereof are similar, and details are not described herein again.

An embodiment of this application further provides a computer-readable storage medium. The computer-readable storage medium stores computer instructions for implementing the method performed by the first DU or the method performed by the first CU or the second access network device in the foregoing method embodiments.

For example, when the computer instructions are executed, a communication apparatus is enabled to implement the method performed by the first DU, the method performed by the first CU, or the method performed by the second access network device in the foregoing method embodiments.

An embodiment of this application further provides a computer program product including instructions. When the instructions are executed, a computer is enabled to implement the method performed by the first DU, the method performed by the first CU, or the method performed by the second access network device in the foregoing method embodiments.

An embodiment of this application further provides a communication system. The communication system includes the first access network device including the first CU and the first DU and/or the second access network device in the foregoing embodiments.

In an example, the communication system includes the first CU and the first DU in the embodiment described with reference to any one of FIG. 12 and FIG. 14 to FIG. 16.

In another example, the communication system includes the first CU and the first DU in the embodiment described with reference to any one of FIG. 19 to FIG. 23.

In another example, the communication system includes the communication apparatus described above with reference to FIG. 24 and the communication apparatus described above with reference to FIG. 25.

In another example, the communication system includes the communication apparatus described above with reference to FIG. 26 or FIG. 27.

In another example, the communication system includes the communication apparatus described above with reference to FIG. 24, the communication apparatus described above with reference to FIG. 25, and the communication apparatus described above with reference to FIG. 26.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The term "a plurality of" in this specification means two or more than two. The term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects. In a formula, the character "/" indicates a "division" relationship between the associated objects.

It may be understood that various numbers in embodiments of this application are merely used for differentiation for ease of description, and are not intended to limit the scope of embodiments of this application.

It should be understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

What is claimed is:

1. A communication method comprising:
receiving, by a centralized unit (CU) of a first access network device from a second access network device, a timing offset between a first cell and a second cell, wherein the first cell is served by a distributed unit (DU) of the first access network device, the second cell is a neighboring cell of the first cell, wherein the second cell is a cell served by the second access network device, and wherein the second access network device comprises a second CU and a second DU, and the second cell is a cell served by the second DU;
sending, by the CU, the timing offset between the first cell and the second cell to the DU; and
sending, by the CU and to the DU, a random access channel (RACH) configuration of the second cell, wherein the timing offset between the first cell and the second cell, the RACH configuration of the second cell, and a RACH configuration of the first cell, are used by the DU to determine whether there is a conflict between the RACH configuration of the first cell and the RACH configuration of the second cell, and wherein based on the conflict between the RACH configuration of the first cell and the RACH configuration of the second cell, the RACH configuration for the first cell is reconfigured by the DU.

2. The method according to claim 1, wherein the timing offset between the first cell and the second cell comprises:
a frame number offset and a frame boundary offset between the first cell and the second cell;
a frame number offset, a subframe number offset, and a subframe boundary offset between the first cell and the second cell; or
a time offset, relative to a frame boundary of a same frame, between the first cell and the second cell.

3. The method according to claim 1, wherein the sending the timing offset between the first cell and the second cell to the DU comprises:
receiving, by the CU, a request message from the DU, wherein the request message is for requesting to obtain the timing offset between the first cell and the second cell, or requesting to obtain the RACH configuration of the second cell; and
sending, by the CU, the timing offset between the first cell and the second cell to the DU based on the request message.

4. The method according to claim 3, wherein the request message carries an identifier of the first cell.

5. The method according to claim 1, wherein the sending, by the CU, the timing offset between the first cell and the second cell to the DU comprises:
receiving, by the CU, an F1 setup request message from the DU; and
sending, by the CU, an F1 setup response message or a CU configuration update message to the DU, wherein the F1 setup response message comprises the timing offset between the first cell and the second cell, and wherein the CU configuration update message comprises the timing offset between the first cell and the second cell.

6. A communication method comprising:
receiving, by a distributed unit (DU) of a first access network device, a timing offset between a first cell and a second cell from a centralized unit (CU) of the first access network device, wherein the timing offset is from a second access network device, wherein the first cell is served by the DU, the second cell is a neighboring cell of the first cell, wherein the second cell is a cell served by the second access network device, and wherein the second access network device comprises a second CU and a second DU, and the second cell is a cell served by the second DU;
storing, by the DU, the timing offset between the first cell and the second cell;
receiving, by the DU, a random access channel (RACH) configuration of the second cell from the CU;
determining, by the DU based on the timing offset between the first cell and the second cell, the RACH configuration of the second cell, and a RACH configuration of the first cell, whether there is a conflict between the RACH configuration of the first cell and the RACH configuration of the second cell; and based on the conflict between the RACH configuration of the first cell and the RACH configuration of the second cell, reconfiguring, by the DU, the RACH configuration for the first cell.

7. The method according to claim 6, wherein the timing offset between the first cell and the second cell comprises:

a frame number offset and a frame boundary offset between the first cell and the second cell;

a frame number offset, a subframe number offset, and a subframe boundary offset between the first cell and the second cell; or a time offset, relative to a frame boundary of a same frame, between the first cell and the second cell.

8. The method according to claim 6, wherein the receiving, by the DU, the timing offset between the first cell and the second cell comprises:

sending, by the DU, a request message to the CU, wherein the request message is for requesting to obtain the timing offset between the first cell and the second cell, or requesting to obtain a random access channel (RACH) configuration of the second cell; and receiving, by the DU, the timing offset between the first cell and the second cell based on the request message.

9. The method according to claim 6, wherein the receiving, by the DU, the timing offset between the first cell and the second cell comprises:

sending, by the DU, an F1 setup request message to the CU; and receiving, by the DU, an F1 setup response message or a CU configuration update message from the CU, wherein the F1 setup response message comprises the timing offset between the first cell and the second cell, and wherein the CU configuration update message comprises the timing offset between the first cell and the second cell.

10. A communication system, comprising a centralized unit (CU) and distributed unit (DU), wherein:

the CU is configured to: obtain, from a second access network device, a timing offset between a first cell and a second cell, send the timing offset between the first cell and the second cell to the DU, and send, to the DU, a random access channel (RACH) configuration of the second cell, wherein the first cell is a cell served by the DU, the second cell is a neighboring cell of the first cell, and both the CU and the DU belong to a first access network device, wherein the second cell is a cell served by the second access network device, and wherein the second access network device comprises a second CU and a second DU, and the second cell is a cell served by the second DU; and the DU is configured to: receive the timing offset between the first cell and the second cell, store the timing offset between the first cell and the second cell, receive a random access channel (RACH) configuration of the second cell from the CU, determine, based on the timing offset between the first cell and the second cell, the RACH configuration of the second cell, and a RACH configuration of the first cell, whether there is a conflict between the RACH configuration of the first cell and the RACH configuration of the second cell, and based on the conflict between the RACH configuration of the first cell and the RACH configuration of the second cell, reconfigure the RACH configuration for the first cell.

11. The communication system according to claim 10, wherein the CU is configured to:

receive a request message from the DU, wherein the request message is for requesting to obtain the timing offset between the first cell and the second cell, or requesting to obtain the RACH configuration of the second cell; and send the timing offset between the first cell and the second cell to the DU based on the request message.

12. The communication system according to claim 11, wherein the request message carries an identifier of the first cell.

13. The communication system according to claim 10, wherein the CU is configured to:

receive an F1 setup request message from the DU; and send an F1 setup response message or a CU configuration update message to the DU, wherein the F1 setup response message comprises the timing offset between the first cell and the second cell, and wherein the CU configuration update message comprises the timing offset between the first cell and the second cell.

14. The communication system according to claim 10, wherein the timing offset between the first cell and the second cell comprises:

a frame number offset and a frame boundary offset between the first cell and the second cell;

a frame number offset, a subframe number offset, and a subframe boundary offset between the first cell and the second cell; or a time offset, relative to a frame boundary of a same frame, between the first cell and the second cell.

15. The method according to claim 8, wherein the request message carries an identifier of the first cell.

* * * * *